United States Patent
Jiva et al.

(10) Patent No.: US 9,734,491 B2
(45) Date of Patent: Aug. 15, 2017

(54) VOICE CALL PAYMENT SYSTEMS AND METHODS

(71) Applicant: Verizon Patent and Licensing Inc., Arlington, VA (US)

(72) Inventors: Azam Jiva, Basking Ridge, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/788,148

(22) Filed: Jun. 30, 2015

(65) Prior Publication Data

US 2017/0004471 A1    Jan. 5, 2017

(51) Int. Cl.
*H04M 3/42* (2006.01)
*G06Q 20/16* (2012.01)
*G06Q 20/32* (2012.01)
*G06Q 30/06* (2012.01)

(52) U.S. Cl.
CPC ......... *G06Q 20/16* (2013.01); *G06Q 20/3223* (2013.01); *G06Q 30/0617* (2013.01); *G06Q 2220/00* (2013.01)

(58) Field of Classification Search
CPC . H04M 3/5183; G06Q 20/16; G06Q 30/0617; G06Q 20/3223; G06Q 2220/00
USPC ......................................... 379/201.01, 88.02
See application file for complete search history.

(56) References Cited

U.S. PATENT DOCUMENTS

| 2012/0136732 A1* | 5/2012 | McMillen | G06Q 20/105 705/16 |
| 2016/0104145 A1* | 4/2016 | Critchley | G06Q 20/325 705/41 |

* cited by examiner

*Primary Examiner* — Quynh Nguyen

(57) ABSTRACT

Exemplary voice call payment systems and methods provide parties to a voice call with features for sharing sensitive information over an active voice connection supporting the voice call. An exemplary method includes a voice call payment system detecting, during a voice call between a user of a user device and a representative of a merchant over an active voice connection between the user device and a merchant device of the merchant, a request by the user to submit inaudible payment information to the merchant over the active voice connection as payment in a transaction between the user and the merchant, directing, in response to the request, the user device to acquire the inaudible payment information, and directing, in response to the request, the user device to transmit the inaudible payment information to the merchant device over the active voice connection.

20 Claims, 20 Drawing Sheets

VOICE CALL PAYMENT SYSTEMS AND METHODS

BACKGROUND INFORMATION

Parties engaged in a voice call may wish to share sensitive information with one another. However, in certain conditions, traditional communication of the sensitive information over the voice call can expose the sensitive information to a third party who may have malicious intent.

As an example, a customer who calls a merchant to place an order and wishes to offer a payment card (e.g., a credit or debit card) to pay for the order conventionally speaks the card information over the voice call for reception by the merchant. The merchant hears the card information over the voice call and inputs the card information into a point-of-sale device to apply the payment card as payment for the order. Unfortunately, in this example, the card information may be exposed to an eavesdropper near the customer and/or at the merchant location. This may lead to unauthorized use of the card information by a person with malicious intent. Moreover, the speaking of the card information over the voice call may be inefficient and/or inconvenient for the customer, and the reception of the spoken card information over the voice call may be inefficient and/or inconvenient for the merchant.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
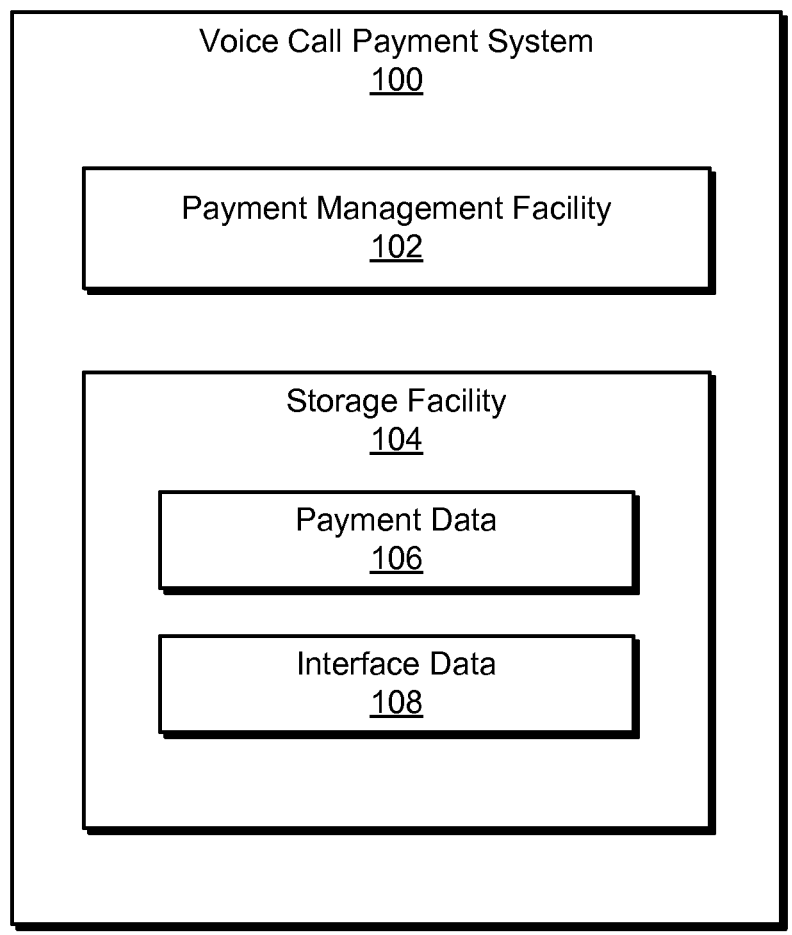
FIG. 1 illustrates an exemplary voice call payment system according to principles described herein.

Exemplary voice call payment systems and methods are described herein. Exemplary systems and methods described herein may allow parties to a voice call to share payment information over an active voice connection supporting the voice call in a private, secure manner. This may be accomplished without the payment information having to be spoken aloud or touch-toned (i.e., by pressing buttons to generate audible tones of different pitch) into a telephone device of the party providing the payment information. Compared to conventional voice call payment options such as speaking or touch-toning payment information into a telephone device, systems and methods described herein may provide improved security, accuracy, and/or convenience in the communicating of payment information over an active voice connection supporting a voice call.

As an example, a user of a user device, such as a mobile phone device, may use the user device to place a voice call to a merchant (e.g., a pizza delivery company) to order and pay for an item (e.g., a pizza). During a voice call between the user and a representative of the merchant, the user may verbally place an order and the merchant representative may verbally request payment for the order by way of the voice call. Instead of speaking or touch-toning payment information to the merchant over the voice call, the user may use one or more features provided by systems and methods described herein to provide inaudible payment information to the merchant over an active voice connection supporting the voice call. The merchant may receive the inaudible payment information over the active voice connection and process the inaudible payment information as payment for the order. Because inaudible payment information is shared over the active voice connection, as described herein, the risk of the payment information being exposed to a third party, such as an eavesdropper near the customer and/or at the merchant location, may be reduced.

As used herein, "payment information" may refer to any information that may be communicated from one party to another and applied as payment for goods or services. Examples of payment information include, but are not limited to, payment card information (e.g., credit card information such as credit card number, expiration date, zip code, security code, etc.), payment service account information (e.g., PAYPAL, APPLE PAY, and ANDROID PAY account information), a payment token (e.g., a standard-based payment token such as an EMV standard-based token), and virtual currency information (e.g., BITCOIN information).

As used herein, "inaudible payment information" refers to payment information that may be communicated from one party to another over an active voice connection supporting a voice call between the parties and that may be provided for transmission over the active voice connection without relying on audible signals such as spoken or touch-toned audio signals. For example, inaudible payment information may include, but is not limited to, digital data representing payment information (e.g., digital data stored in computer memory and representing payment information, digital data manually input by a user of a user device and representing payment information, etc.), a digital image of payment information (e.g., a photo image of a payment card), data stored on a magnetic stripe of a payment card, and data stored on a microchip (e.g., a smart card chip and/or a radio-frequency identification ("RFID") chip) of a payment card.

Examples of voice call payment systems and methods will now be described in reference to the accompanying drawings.

FIG. 1 illustrates an exemplary voice call payment system 100 ("system 100"). As shown, system 100 may include, without limitation, a payment management facility 102 and a storage facility 104 selectively and communicatively coupled to one another. It will be recognized that although facilities 102 and 104 are shown to be separate facilities in FIG. 1, any of facilities 102 and 104 may be combined into fewer facilities, such as into a single facility, or divided into more facilities as may serve a particular implementation. Additionally or alternatively, one or more of the facilities 102 and 104 may be omitted from and external to system 100 in other implementations. For example, storage facility 104 may be external of and communicatively coupled to system 100 in certain alternative implementations. Facilities 102 and 104 of system 100 may include or be otherwise implemented by one or more physical computing devices specifically configured to perform one or more of the operations described herein. In such implementations, system 100 may be referred to as a computer-implemented system 100.

Storage facility 104 may be configured to store data generated and/or used by payment management facility 102. For example, storage facility 104 may store payment data 106 representative of inaudible payment information and interface data 108 representative of information that may be used by payment management facility 102 to interface with an active voice connection, a computing device, and/or a user of a computing device. Storage facility 104 may store additional or alternative data as may serve a particular implementation.

Data stored by storage facility 104 may be accessed by system 100 from any suitable source, including a source internal or external to system 100. Thus, while storage facility 104 is shown to be within system 100 in FIG. 1, in alternative embodiments, storage facility 104 may be external of system 100.

Storage facility 104 may permanently or temporarily store data. In certain examples, system 100 may access certain data from a source external to system 100 and temporarily store the data in storage facility 104 for use by payment management facility 102. In certain examples, data generated by payment management facility 102 may be stored permanently or temporarily to storage facility 104.

Payment management facility 102 may perform any of the voice call payment operations described herein. For example, during a voice call between a user of a user device and a representative of a merchant over an active voice connection between the user device and a merchant device of the merchant, payment management facility 102 may detect a request by the user to submit inaudible payment information to the merchant over the active voice connection as payment in a transaction between the user and the merchant. In response, payment management facility 102 may perform one or more of the operations described herein to facilitate transmission of inaudible payment information to the merchant device over the active voice connection.

Payment management facility 102 may provide one or more features for use by the user and/or the merchant to share inaudible payment information over an active voice connection. In certain examples, payment management facility 102 may provide such features by providing a user interface and/or features of a user interface for use by the user and/or the merchant to share inaudible payment information over an active voice connection. Exemplary graphical user interfaces ("GUIs") and features of GUIs that may be provided by payment management facility 102 are described herein.

Figure 2:
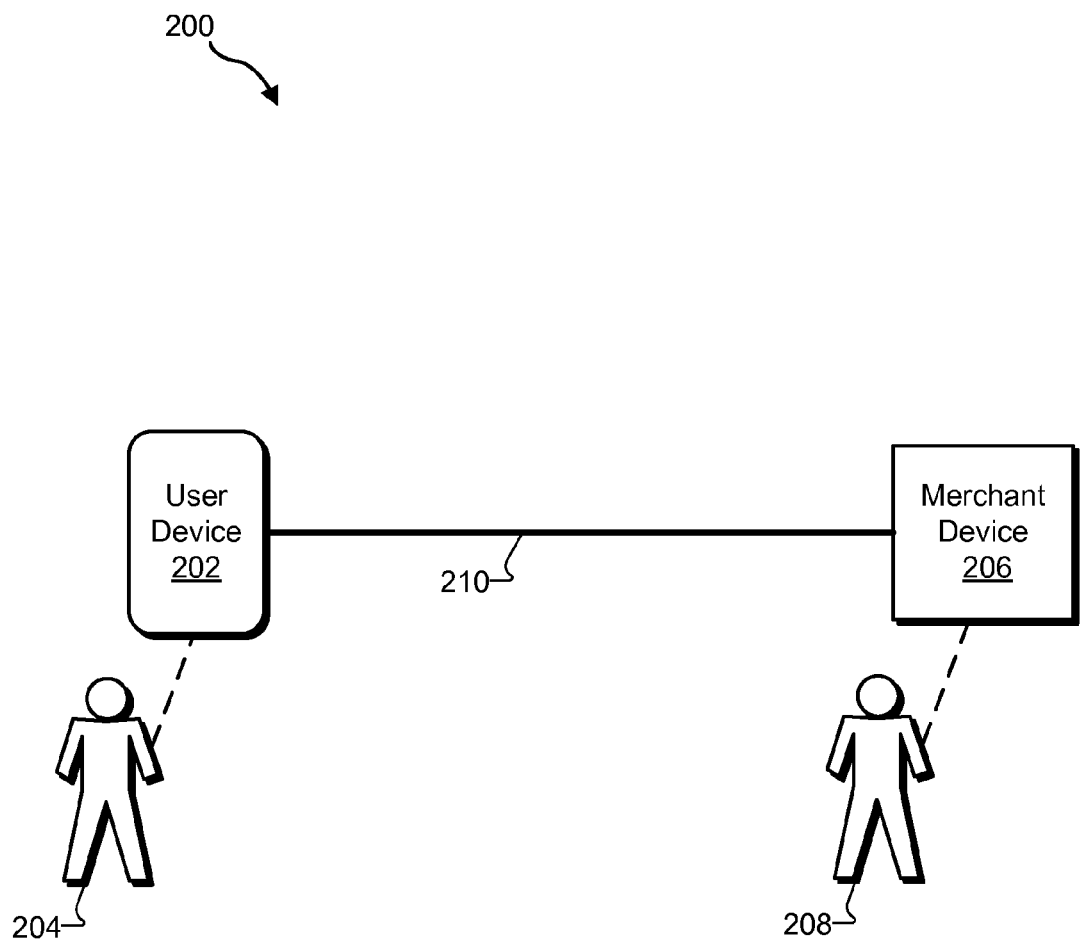
FIG. 2 illustrates an exemplary voice call payment system according to principles described herein.

FIG. 2 illustrates an exemplary voice call payment system 200 ("system 200") that implements system 100. As shown, system 200 may include a user device 202 associated with a user 204 and a merchant device 206 associated with a merchant 208. System 100 may be implemented by system 200 in any suitable way. For example, one or more facilities of system 100 may be implemented entirely by user device 202, entirely by merchant device 206, or distributed across user device 202 and merchant device 206. Accordingly, system 100 may direct user device 202 and/or merchant device 206 to perform one or more operations of user device 202 and/or merchant device 206 described herein.

User device 202 and merchant device 206 may be configured to establish, maintain, and terminate an active voice connection 210 between user device 202 and merchant device 206. When active voice connection 210 is established between user device 202 and merchant device 206 as shown in FIG. 2, user device 202 and merchant device 206 may communicate with one another over active voice connection 210. Active voice connection 210 may be any connection between user device 202 and merchant device 206 that supports a voice call between the user 204 and the merchant 208. For example, active voice connection 210 may be any telecommunication connection capable of carrying signals and/or data representing sounds (e.g., human voice sounds provided by user 204 and/or merchant 208 during a voice call between user 204 and merchant 208) between user device 202 and merchant device 206. With active voice connection 210 established between user device 202 and merchant device 206, a voice call is established between user 204 and merchant 208. Accordingly, when active voice connection 210 is established between user device 202 and merchant device 206 as shown in FIG. 2, user 204 and merchant 208 may communicate with one another (e.g., speak to one another and/or carry on a conversation with one another) over a voice call supported by active voice connection 210.

Active voice connection 210 may be established, maintained, and/or terminated using any suitable voice communication technologies, including, without limitation, public switched telephone network ("PSTN") technologies, radio frequency communication technologies, channel-based access technologies, code division multiple access ("CDMA") technologies, time division multiple access ("TDMA") technologies, global system for mobile communications ("GSM") technologies, voice over long term evolution ("VoLTE") technologies, packet-based access technologies, circuit-switched voice communication technologies, packet-switched voice communication technologies, cellular network technologies, mobile phone technologies, voice over internet protocol ("VoIP") technologies, full duplex voice telephony technologies, or any combination or sub-combination thereof.

Accordingly, active voice connection 210 may be any connection between user device 202 and merchant device 206 that supports a voice call between user 204 and merchant 208. As an example, active voice connection 210 may include a telephony circuit formed over a circuit-switched network, one or more transmission paths over a packet-switched network, or a combination thereof.

User device 202 may be any device configured to perform one or more operations to establish, maintain, and/or terminate active voice connection 210 with merchant device 206 and to facilitate user 204 communicating with merchant 208 by way of a voice call supported by active voice connection 210. To this end, user device 202 may implement one or more full duplex telephony technologies and/or equipment (e.g., an audio speaker, a microphone, an analog-to-digital converter, a digital-to-analog converter, a codec, a phone network chipset, etc.) to support participation by user 204 in a voice call. In certain examples, user device 202 may be a telephone device, a mobile phone device, a VoIP device, or other computing device that may be used by user 204 to participate in a voice call.

User device 202 may also be configured to perform one or more of the voice call payment operations described herein. For example, user device 202 may be directed by system 100 to perform one or more operations to facilitate transmission of inaudible payment information to merchant device 206 over active voice connection 210, such as by providing one or more voice call payment features to user 204 (e.g., by way of a GUI displayed on a display screen of user device 202), receiving user input from user 204 (e.g., a user request to provide inaudible payment information to merchant 208), and acquiring and transmitting inaudible payment information to merchant device 206 over active voice connection 210, as described herein.

In certain examples, user 204 may be referred to as a consumer and may use user device 202 in any of the ways described herein to provide inaudible payment information over active voice connection 210 to merchant 208 as payment in a transaction with merchant 208.

Merchant device 206 may be any device configured to perform one or more operations to establish, maintain, and/or terminate active voice connection 210 with user device 202 and to facilitate merchant 208 communicating with user 204 by way of a voice call supported by active voice connection 210. To this end, merchant device 206 may implement one or more full duplex telephony technologies and/or equipment (e.g., an audio speaker, a microphone, an analog-to-digital converter, a digital-to-analog converter, a codec, a phone network chipset, etc.) to support participation by merchant 208 in a voice call. In certain examples, merchant device 206 may be a telephone device, a mobile phone device, a VoIP device, or other computing device that may be used by merchant 208 to participate in a voice call.

Merchant device 206 may also be configured to perform one or more of the voice call payment operations described herein. For example, merchant device 206 may be directed by system 100 to perform one or more operations to facilitate reception of inaudible payment information from user device 202 over active voice connection 210 and processing of the inaudible payment information as payment in a transaction between user 204 and merchant 208, as described herein. Merchant device 206 may be a single standalone device or a set of standalone devices operated by merchant 208.

In certain examples, merchant 208 may include a representative of a merchant, such as a human employee of the merchant or an automated agent of the merchant, such as an automated interactive voice response system capable of using audible voice communications to communicate with user 204 over a voice call.

In certain examples, during a voice call between user 204 of user device 202 and a representative of merchant 208 over active voice connection 210 between user device 202 and merchant device 206 of merchant 208, payment management facility 102 may detect a request by user 204 to submit inaudible payment information to merchant 208 over active voice connection 210 as payment in a transaction between user 204 and merchant 208. In response, payment management facility 102 may direct user device 202 and/or merchant device 206 to perform one or more of the operations described herein to facilitate transmission of the inaudible payment information to merchant device 206 over active voice connection 210. Merchant device 206 may receive the inaudible payment information over active voice connection 210 and process the inaudible payment information as payment in a transaction between user 204 and merchant 208.

Figure 3:
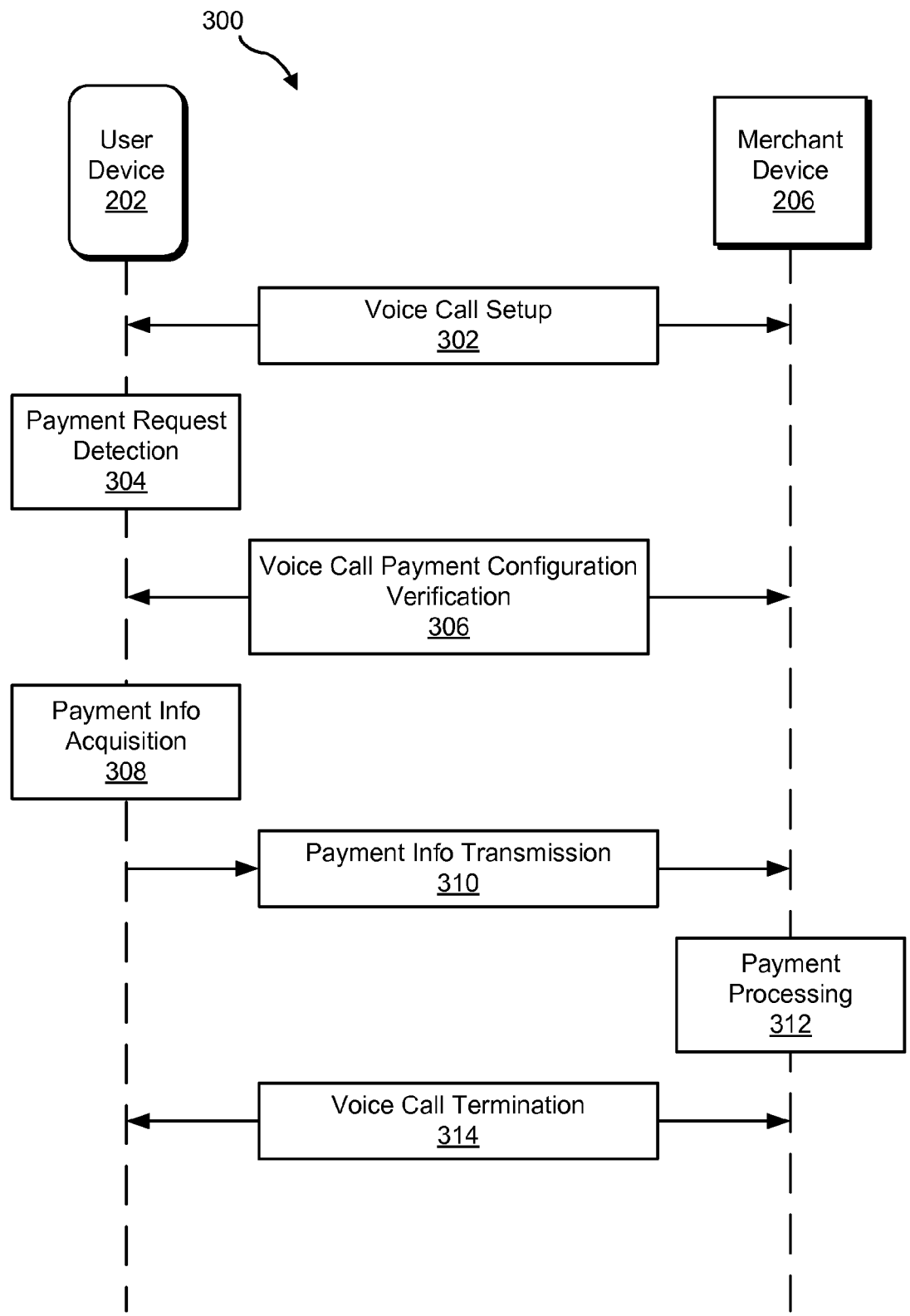
FIG. 3 illustrates an exemplary operational flow according to principles described herein.

To illustrate, FIG. 3 shows an exemplary operational flow 300 for a voice call payment. At voice call setup 302, user device 202 and merchant device 206 establish a voice call between user 204 and merchant 208. The establishment of the voice call includes user device 202 and merchant device 206 establishing active voice connection 210 between user device 202 and merchant device 206 to support the voice call. Active voice connection 210 and the voice call may be established at voice call setup 302 in any suitable way and using any suitable voice call and/or voice connection technologies.

At payment request detection 304, payment management facility 102 detects a request provided by user 204, through user device 202, to submit inaudible payment information to merchant 208 over active voice connection 210 as payment in a transaction between user 204 and merchant 208. For example, during the established voice call between user 204 and a representative of merchant 208 (e.g., during a conversation between user 204 and a representative of merchant 208 regarding an order for goods or services or another potential transaction between user 204 and merchant 208), payment management facility 102 may detect a request by user 204 to submit inaudible payment information to merchant 208 over active voice connection 210 as payment in a transaction between user 204 and merchant 208.

Figure 4:
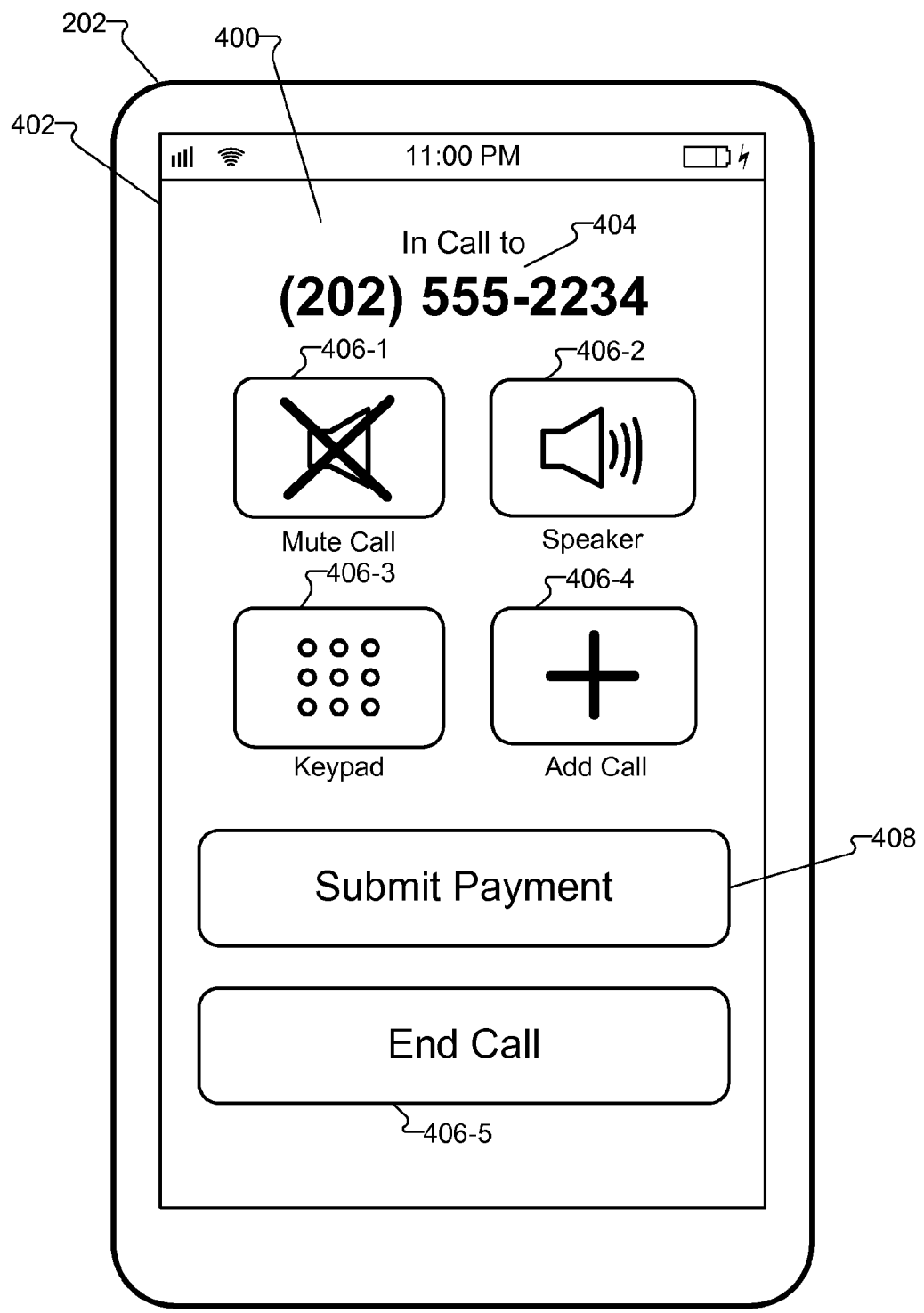
FIGS. 4-7 illustrate exemplary graphical user interface views according to principles described herein.

User 204 may provide the request to submit inaudible payment information to merchant 208 in any suitable way, such as by providing input indicating the request to user device 202. To this end, payment management facility 102 may direct user device 202 to provide one or more features for use by user 204 to provide the request. To illustrate one example, FIG. 4 shows a GUI view 400 that may be displayed on a display screen 402 of user device 202 when user device 202 is connected to active voice connection 210 supporting a voice call between user 204 and merchant 208. Payment management facility 102 may direct user device 202 to provide GUI view 400 and/or one or more features of GUI view 400 for display by user device 202 during the voice call.

As shown in FIG. 4, GUI view 400 may indicate information about the voice call, such as a notification 404 that user device 202 is connected to a voice call with another device associated with a specific phone number. GUI view 400 may also include a menu of voice call management options 406 (e.g., options 406-1 through 406-5) that may be selected by user 204 to manage the voice call. Options 406 may include, for example, option 406-1 selectable by user 204 to mute or unmute voice call audio input, option 406-2 selectable by user 204 to toggle speaker output from one speaker to another speaker of user device 202, option 406-3 selectable by user 204 to launch a virtual telephone keypad for display in GUI view 400, option 406-4 selectable by user 204 to place an additional voice call to be merged with the established voice call to form a conference voice call, and option 406-5 selectable by user 204 to terminate the established voice call.

As further shown in FIG. 4, GUI view 400 may also include a payment option 408 selectable by user 204 to request to provide inaudible payment information to the other party on the voice call. For example, user 204 may provide input (e.g., touch screen input) to select payment option 408 to indicate a request to provide inaudible payment information to merchant 208. Payment management facility 102 may detect the request as a request to submit inaudible payment information to merchant 208 over active voice connection 210 supporting the voice call.

Payment option 408 is one exemplary way for user 204 to indicate a request to provide inaudible payment information to merchant 208 over active voice connection 210 supporting the voice call. Payment management facility 102 may provide additional or alternative tools for use by user 204 to indicate a request to provide inaudible payment information to merchant 208 over active voice connection 210 supporting the voice call in other examples. For instance, payment management facility 102 may be configured to detect one or more predefined voice commands spoken by user 204 as a request to provide inaudible payment information to merchant 208 over active voice connection 210 supporting the voice call.

In certain examples, payment management facility 102 may require user 204 authentication in order to detect and/or process a request to provide inaudible payment information to merchant 208 over active voice connection 210 supporting the voice call. For instance, payment management facility 102 may use one or more biometrics to authenticate user 204 before making a payment option available to user 204 and/or before detecting or processing a request to provide inaudible payment information to merchant 208 over active voice connection 210 supporting the voice call.

In response to detecting the request at payment request detection 304 shown in FIG. 3, payment management facility 102 may direct user device 202 and/or merchant device 206 to perform one or more operations to facilitate transmission of the inaudible payment information from user device 202 to merchant device 206 over active voice connection 210. Returning to FIG. 3, for example, at voice call payment configuration verification 306, payment management facility 102 may direct user device 202 to verify that merchant 208 is equipped to receive and process inaudible payment information. For instance, payment management facility 102 may direct user device 202 to transmit a predetermined signal to merchant device 206 over active voice connection 210. The predetermined signal may be any signal that may be generated by user device 202, transmitted over active voice connection 210, and received by merchant device 206. For example, the predetermined signal may include a predetermined audio signal such as a predefined set of audio tones.

Payment management facility 102 may direct merchant device 206 to detect the predetermined signal transmitted by user device 202 over active voice connection 210. In response to detecting receipt of the predetermined signal, payment management facility 102 may direct merchant device 206 to transmit an acknowledgement to user device 202 over active voice connection 210 to verify to user device 202 that merchant device 206 is equipped to receive and process inaudible payment information.

Payment management facility 102 may direct user device 202 to detect the acknowledgement transmitted by merchant device 206 over active voice connection 210 and to interpret the acknowledgement as verification that merchant device 206 is equipped to receive and process inaudible payment information.

While voice call payment configuration verification 306 may be performed in response to payment request detection 304 in certain examples, in other examples voice call payment configuration verification 306 may be omitted from an operational flow for a voice call payment or performed prior to payment request detection 304 in an operational flow for a voice call payment. For example, in certain alternative examples, voice call payment configuration verification 306 may be performed as part of voice call setup 302 or in response to voice call setup 302.

At payment information acquisition 308, payment management facility 102 may direct user device 202 to acquire inaudible payment information for transmission over active voice connection 210. Payment management facility 102 may direct user device 102 to acquire the inaudible payment information in any suitable way. As an example, payment management facility 102 may direct user device 202 to retrieve data representative of the inaudible payment information from a non-transitory computer-readable medium, such as from local memory of user device 202. For instance, if payment management facility 102 has been preconfigured to use specific pre-stored inaudible payment information, payment management facility 102 may, in response to payment request detection 304, direct user device 202 to retrieve data representative of the pre-stored inaudible payment information from local memory of user device 202.

As another example, payment management facility 102 may direct user device 202 to prompt user 204 to input inaudible payment information into user device 102. The prompt may be in any suitable form, such as an indication that user device 102 is ready to receive inaudible payment information input, instructions indicating how user 204 may input inaudible payment information to user device 202, and/or one or more menus of options selectable by user 204 to select inaudible payment information for a particular payment option and/or to select a particular way to input inaudible payment information to user device 202.

Payment management facility 102 may restrict the ways that user 204 may input inaudible payment information to user device 202 to ways that do not rely on or use audible signals that could be overheard by an eavesdropper near user 204. For example, payment management facility 102 may direct user device 202 to prompt user 204 to input inaudible payment information by swiping a payment card in a magnetic reader device included in or connected to user device 202, capturing a photograph of inaudible payment information (e.g., of a payment card) with a camera device included in or connected to user device 202, manually typing inaudible payment information using a non-touch-tone keypad of user device 202 (e.g., a virtual non-touch-tone numeric keypad and/or QWERTY keyboard provided by user device 202), and/or navigating one or more menus of payment options in a GUI provided for display on display screen 402 of user device 202 and providing input to select one or more menu options.

Figure 5:
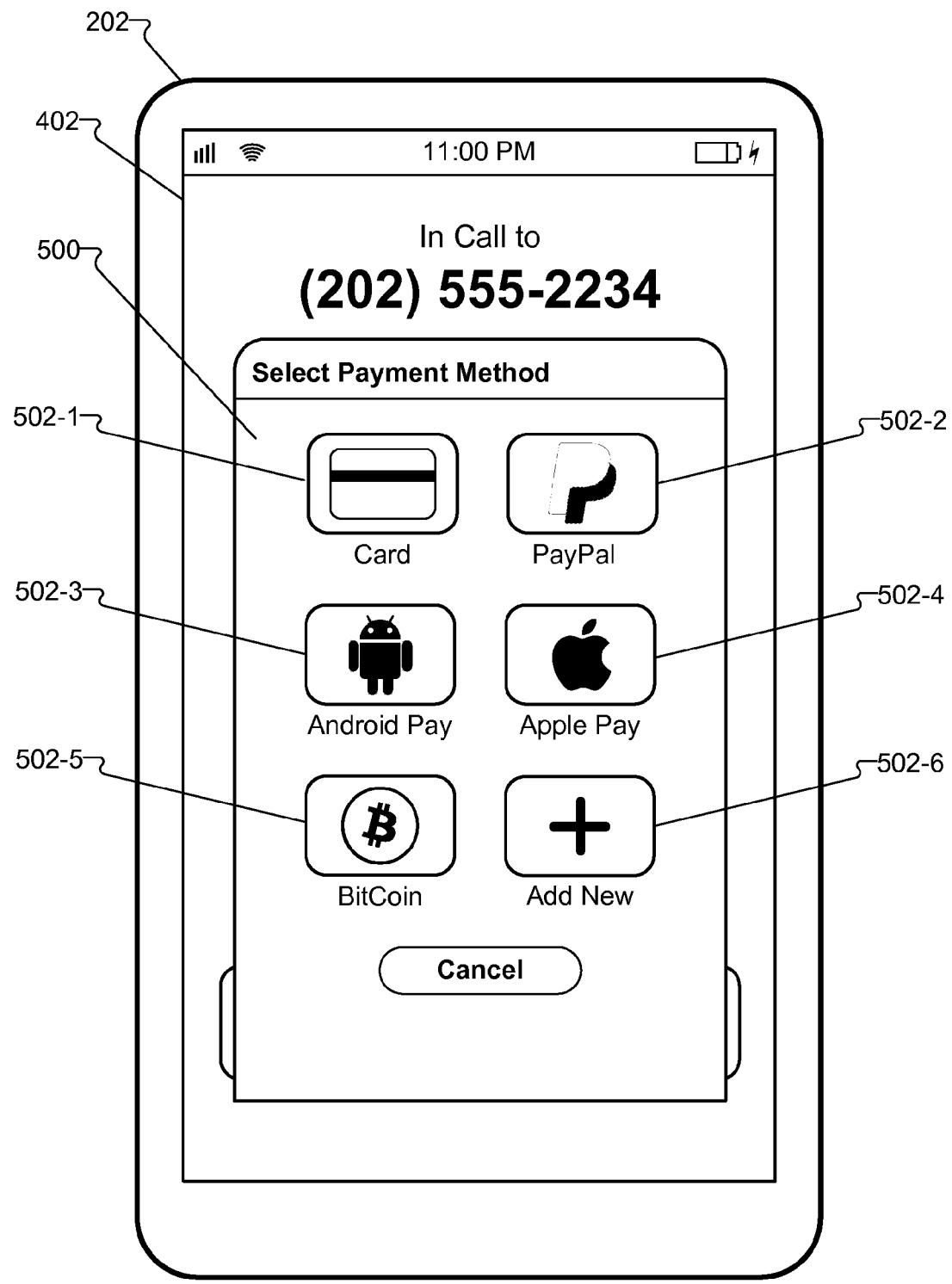

FIG. 5 shows a GUI view 500 that may be displayed on display screen 402 of user device 202. Payment management facility 102 may provide GUI view 500 and/or one or more features of GUI view 500 for display by user device 202.

As shown in FIG. 5, GUI view 500 may include a menu of payment options 502 (e.g., options 502-1 through 502-6) that may be selected by user 204 to indicate a payment method to be used as payment in a transaction between user 204 and merchant 208. Options 502 may include, for example, option 502-1 selectable by user 204 to use a payment card, option 502-2 selectable by user 204 to use a PAYPAL account, option 502-3 selectable by user 204 to use an ANDROID PAY account, option 502-4 selectable by user 204 to use an APPLE PAY account, option 502-5 selectable by user 204 to use BITCOIN virtual currency, and option 502-6 selectable by user 204 to add and use a new payment method.

In response to a user selection of a menu option 502, payment management facility 102 may direct user device 202 to determine whether data representative of inaudible payment information for the selected method is already stored in local memory of user device 202. If the inaudible payment information for the selected payment method is stored in local memory, payment management facility 102 may direct user device 202 to retrieve data representative of the inaudible payment information from memory for transmission over active voice connection 210. If the inaudible payment information for the selected payment method is not stored in local memory, payment management facility 102 may direct user device 202 to prompt user 204 to input new inaudible payment information for the selected payment method in a manner that does not rely on or use audible signals that could be overheard by an eavesdropper near user 204.

If the selected payment method has multiple sub-options, payment management facility 102 may direct user device 202 to provide a menu of the sub-options each selectable by user 204 to select a specific payment method. For example, payment option 502-1 may have multiple sub-options for various payment cards, and, in response to a user selection of option 502-1, payment management facility 102 may direct user device 202 to display a menu of the sub-options.

Figure 6:
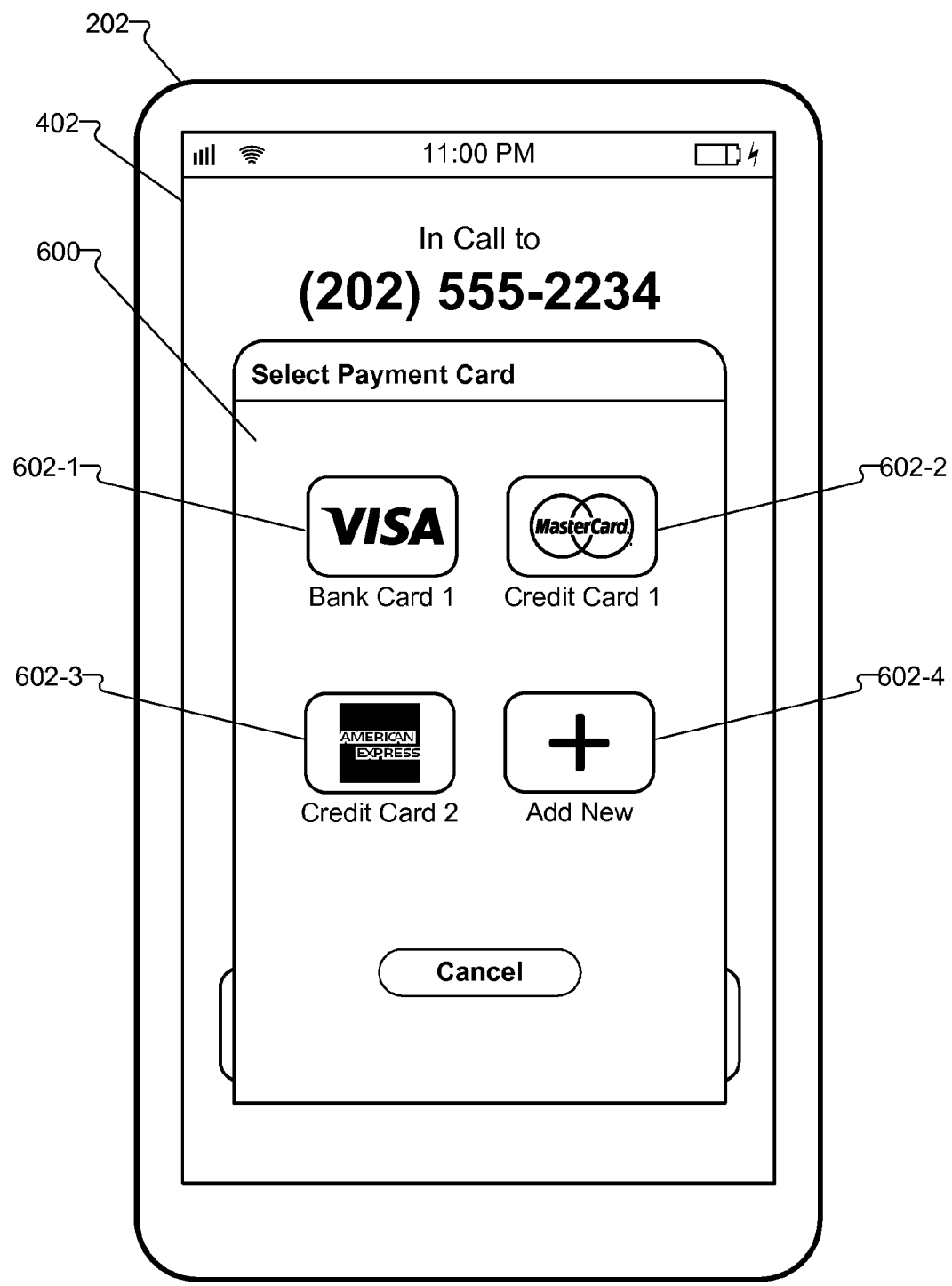

FIG. 6 shows a GUI view 600 that may be displayed on display screen 402 of user device 202. Payment management facility 102 may provide GUI view 600 and/or one or more features of GUI view 600 for display by user device 202.

As shown in FIG. 6, GUI view 600 may include a menu of payment card options 602 (e.g., options 602-1 through 602-4) that may be selected by user 204 to indicate a payment card to be used as payment in a transaction between user 204 and merchant 208. Options 602 may include, for example, option 602-1 selectable by user 204 to use a particular payment card, option 602-2 selectable by user 204 to use another particular payment card, option 602-3 selectable by user 204 to use another particular payment card, and option 602-4 selectable by user 204 to add and use a new payment card.

In response to a user selection of a payment card option 602, payment management facility 102 may direct user device 202 to determine whether data representative of inaudible payment information for the selected payment card is already stored in local memory of user device 202. If the inaudible payment information for the selected payment card is stored in local memory, payment management facility 102 may direct user device 202 to retrieve data representative of the inaudible payment information for the selected payment card from memory for transmission over active voice connection 210. If the inaudible payment information for the selected payment card is not stored in local memory, payment management facility 102 may direct user device 202 to prompt user 204 to input new inaudible payment information for the selected payment card in a manner that does not rely on or use audible signals that could be overheard by an eavesdropper near user 204.

Figure 7:
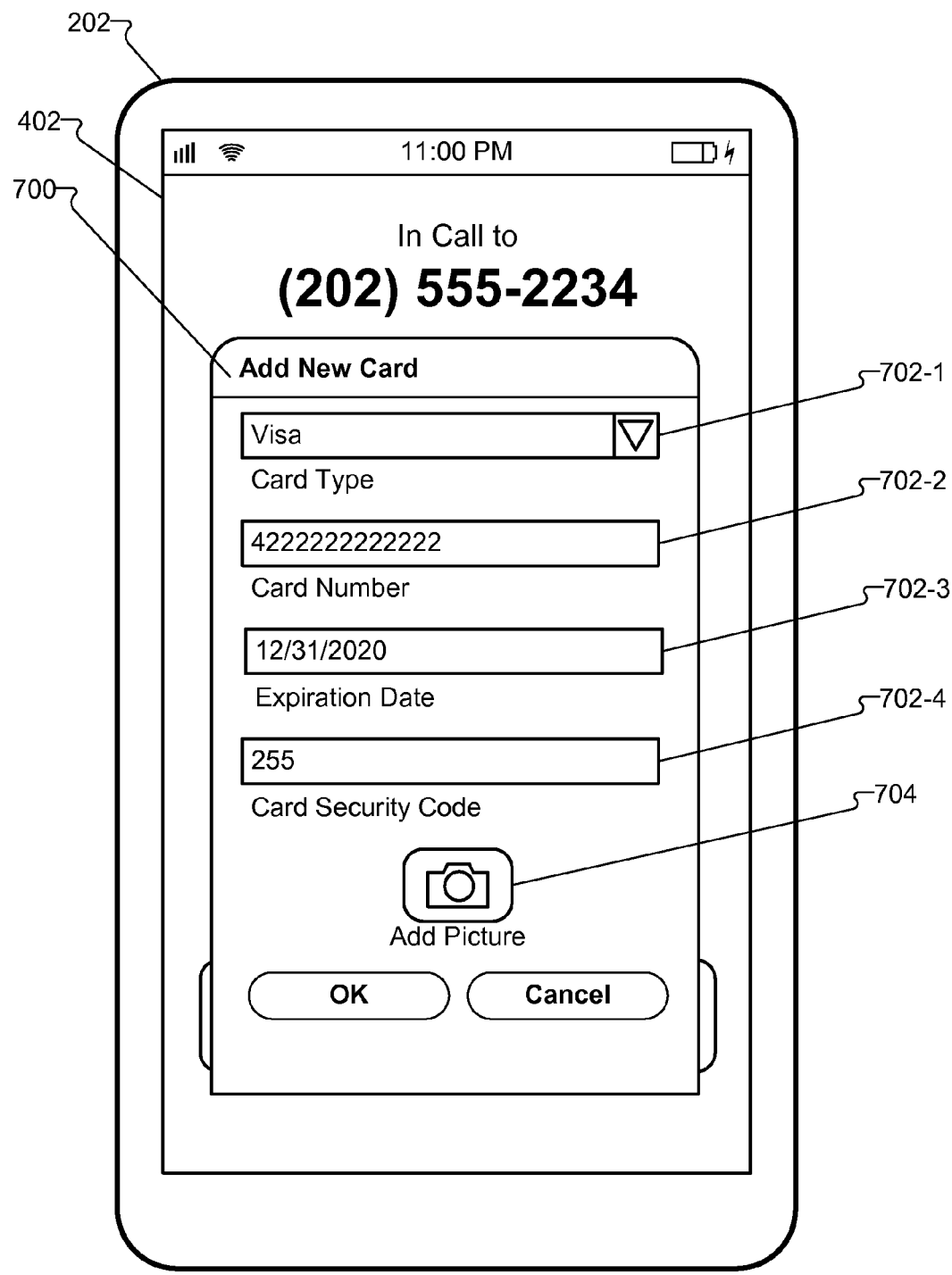

FIG. 7 shows a GUI view 700 that may be displayed on display screen 402 of user device 202. Payment management facility 102 may provide GUI view 700 and/or one or more features of GUI view 700 for display by user device 202.

As shown in FIG. 7, GUI view 700 may include one or more tools for use by user 204 to input inaudible payment information for a new payment card. For example, GUI view 700 may include text input fields 702 (e.g., text input fields 702-1 through 702-4) into which user 204 may input inaudible payment information for the new payment card, such as by using a virtual non-touch-tone numeric keypad and/or QWERTY keyboard. GUI view 700 may additionally or alternatively include an option 704 selectable by user 204 to input inaudible payment information in the form of a photograph image of the new payment card.

In certain examples, menu options, such as payment options 502 and 602 shown in FIGS. 5 and 6, may be hard-coded, static options. In other examples, payment management facility 102 may dynamically select a set of menu options to include in a GUI view based on one or more factors. For example, payment management facility 102 may select a menu of payment options for inclusion in a GUI view based on preconfigured settings of payment management facility 102 and/or user device 202, such as settings indicating one or more payment options that have been previously input by user 204. To illustrate, if user 204 has preconfigured payment management facility 102 and/or user device 202 by inputting inaudible payment information for two different payment cards, payment management facility 102 may populate a GUI view with selectable options for the two different payment cards.

Additionally or alternatively, payment management facility 102 may select a menu of payment options for inclusion in a GUI view based on payment option information received from merchant device 206. For example, merchant device 206 may transmit payment option information to user device 202 over active voice connection 210 to indicate a set of payment options that merchant 208 accepts as payment. Merchant device 206 may transmit payment option information to user device 202 over active voice connection 210 at any suitable time and/or in any suitable way. For instance, merchant device 206 may transmit payment option information to user device 202 over active voice connection 210 as part of or in response to voice call setup 302 or voice call payment configuration verification 306 shown in FIG. 3. Payment management facility 102 may use the received payment option information to select payment options for inclusion in a GUI view, such that a displayed menu of payment options includes only payment options that merchant 208 accepts, for example.

Returning to FIG. 3, after payment information acquisition 308, payment management facility 102 may direct user device 202 to transmit the acquired inaudible payment information to merchant device 206 over active voice connection 210 at payment information transmission 310. This may include directing user device 202 to perform one or more operations to process data representative of the inaudible payment information in preparation for transmission over active voice connection 210. For example, if active voice connection 210 includes an analog connection, payment management facility 102 may direct user device 202 to perform digital-to-analog conversion operations and/or modulation operations to put the inaudible payment information in a form that is ready to be transmitted over active voice connection 210. If active voice connection 210 includes a digital connection, payment management facility 102 may direct user device 202 to perform one or more operations (e.g., modulation operations) to put the inaudible payment information in a form that is ready to be transmitted over active voice connection 210.

After the inaudible payment information is in an appropriate form for transmission, payment management facility 102 may direct user device 202 to transmit the inaudible payment information over the same active voice connection 210 that supports the voice call in any suitable manner, including any known manner for transmitting data over an active voice connection that supports a voice call. If active voice connection 210 includes a circuit in a circuit-switched network, payment management facility 102 may direct user device 202 to use the same circuit and/or circuit settings for transmission of the inaudible payment information over active voice connection 210, without having to establish a different connection. If active voice connection 210 includes a suitable routing path over a packet-switched network, payment management facility 102 may direct user device 202 to use the same routing path settings and/or endpoint information (e.g., same endpoint addresses and/or ports) to transmit the inaudible payment information over a suitable path over the packet-switched network, without having to establish a different connection. In certain examples, payment management facility 102 may direct user device 202 to transmit the inaudible payment information over active voice connection 210 using the same band, ports (e.g., Transmission Control Protocol ("TCP"), User Datagram Protocol ("UDP"), Real-time Transport Protocol ("RTP"), or other protocol ports), codec, session, and/or channel that is used for active voice connection 210.

In certain examples, payment management facility 102 may direct user device 202 to use a designated special frame or frame type within a protocol, instead of a voice frame or voice frame type within the protocol, to transmit the inaudible payment information over the same active voice connection 210 that supports the voice call. To illustrate, user 204 and a representative of merchant 208 may be participating in a voice call supported by active voice connection 210 between user device 202 and merchant device 206. Each device may be using a codec such as an Adaptive Multi-Rate Wideband ("AMR-WB") codec and a protocol such as RTP to exchange voice signals over active voice connection 210 during the voice call. RTP voice frame types (e.g., RTP frame types 1, 2, 3, etc.) may be used to transport voice signals over active voice connection 210 during the voice call. Payment management facility 102 may direct user device 202 to use a designated special frame or frame type such as a special RTP frame type (e.g., RTP frame type x) to transmit the inaudible payment information over the same active voice connection 210 that supports the voice call. Payment management facility 102 may direct merchant device 206 to use the same designated special frame or frame type to transmit an acknowledgment of the inaudible payment information (e.g., a payment confirmation) to user device 202 over active voice connection 210. In such an example, payment management facility 102 may direct user device 202 and merchant device 206 to generate, interpret, or otherwise use frame types, modes, and/or content in accordance with an industry standard (e.g., a European Telecommunications Standards Institute ("ETSI") technical specification such as ETSI TS 126 201 V10.0) and/or with a proprietary standard. Table 1 illustrates a defined mapping of frame types to frame content that may be used by payment management facility 102, user device 202, and/or merchant device 206 to generate and/or interpret signals transported over active voice connection 210. As shown, RTP voice frame types may be mapped to frame content that includes audio signals, and a special RTP frame type x may be mapped to inaudible data such as inaudible payment information.

TABLE 1

Interpretation of Frame Type

| Frame Type Index | Frame Content |
|---|---|
| 0 | AMR-WB 6.60 kbit/s |
| 1 | AMR-WB 8.85 kbit/s |
| 2 | AMR-WB 12.65 kbit/s |
| 3 | AMR-WB 14.25 kbit/s |
| 4 | AMR-WB 15.85 kbit/s |
| 5 | AMR-WB 18.25 kbit/s |
| 6 | AMR-WB 19.85 kbit/s |
| 7 | AMR-WB 23.05 kbit/s |
| 8 | AMR-WB 23.85 kbit/s |
| 9 | AMR-WB SID (Comfort Noise Frame) |
| 10-13 | For Future Use |
| 14 | Speech Lost |
| 15 | No Data (No Transmission/No Reception |
| x | Inaudible Data |

By directing user device 202 to transmit the inaudible payment information over active voice connection 210 in any of the ways described herein or in any other suitable manner, payment management facility 102 may facilitate transmission of the inaudible payment information to merchant 208 without having to establish and use a separate connection, and without having to depend on another network different from a network over which active voice connection 210 is established. For example, inaudible payment information may be transmitted to merchant device 206 over the same voice communication network (e.g., a cellular phone network) without having to use the Internet, a mobile data network, or any other network.

Payment management facility 102 may direct merchant device 206 to receive the inaudible payment information transmitted by user device 202 over active voice connection 210 and to use the inaudible payment information to process payment at payment processing 312. At payment processing 312, payment management facility 102 may direct merchant device 206 to perform one or more operations to put the received inaudible payment information in a form usable by merchant device 206 and/or merchant 208 (e.g., a representative of merchant) to process the inaudible payment information as payment in a transaction between user 204 and merchant 208.

As an example, payment management facility 102 may direct merchant device 206 to display the inaudible payment information on a display screen and/or to play audio of the inaudible payment information with a speaker for use by a representative of merchant to input the inaudible payment information into a point-of-sale system of merchant 208. An another example, payment management facility 102 may direct merchant device 206 to provide the inaudible payment information directly to a point-of-sale system of merchant 208 through a computing device interface (e.g., an application program interface) for processing as payment in the transaction. In such an example, the inaudible payment information may not be exposed to a representative of merchant 208, which may help limit the potential exposure and misuse of the inaudible payment information.

Figure 8:
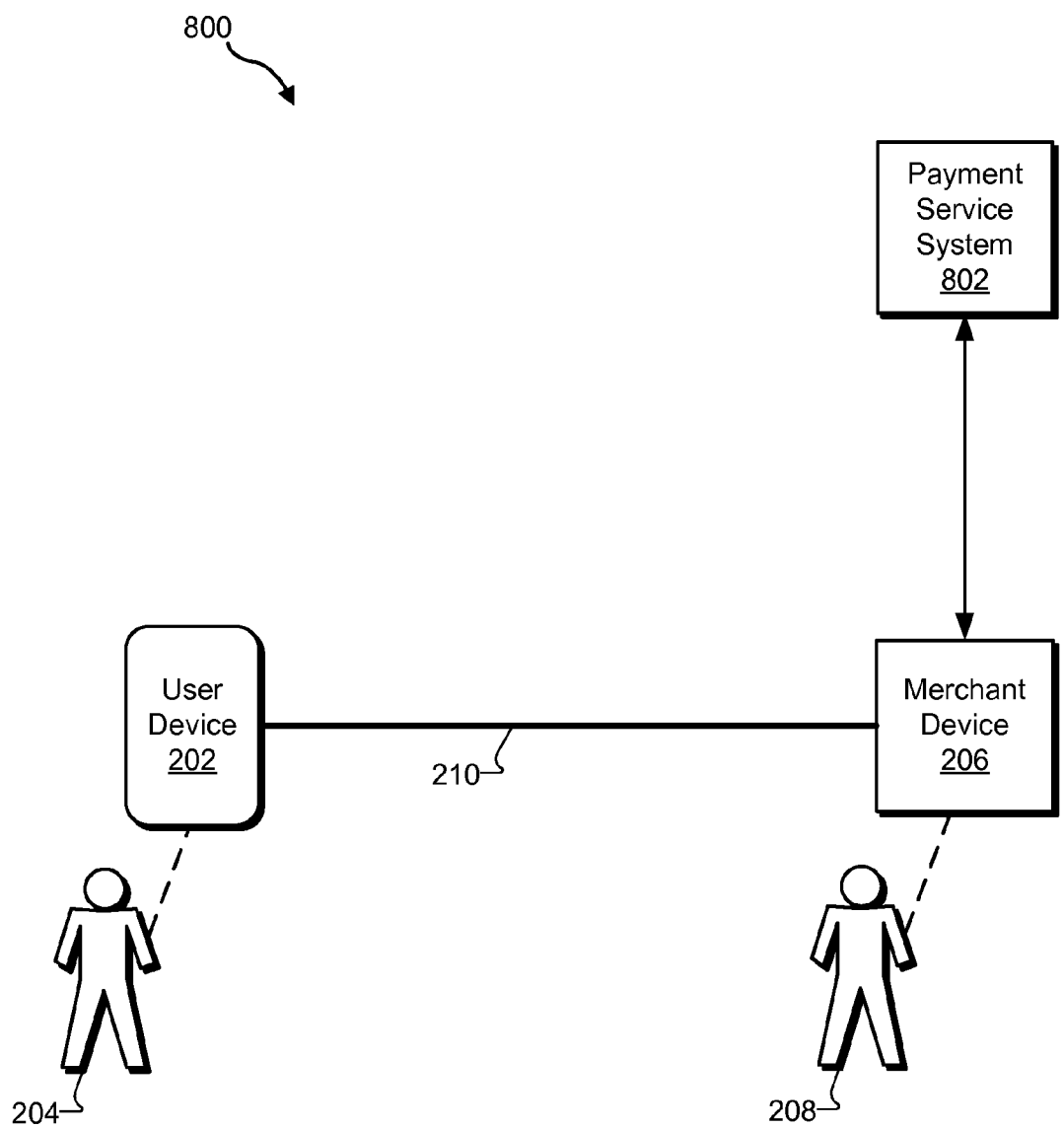
FIG. 8 illustrates an exemplary voice call payment system according to principles described herein.

In certain examples, payment management facility 102 may direct merchant device 206 to provide the inaudible payment information to a third-party payment service system for verification of the inaudible payment information as valid payment. For example, FIG. 8 illustrates another exemplary voice call payment system 800 ("system 800") that implements system 100. System 800 may be as system 200 and may additionally include a payment service system 802, which may be a server system operated by a third party that provides a payment service. For instance, payment service system 802 may include a server system operated by a payment card service provider.

Merchant device 206 and payment service system 802 may communicate one with another over any suitable connection, such as a connection over a wide area network (e.g., the Internet, a long term evolution ("LTE") data network or other wireless data network, etc.).

Payment management facility 102 may direct merchant device 206 to transmit the received inaudible payment information to payment service system 802 (e.g., a third-party payment server device), receive a verification of the inaudible payment information from payment service system 802, and apply the verified inaudible payment information as payment in a transaction between user 204 and merchant 208. In such an example, the inaudible payment information may not be exposed to merchant 208, which may help limit the potential exposure and misuse of the inaudible payment information.

In certain examples, one or more of operations 306-312 of FIG. 3 may be performed by payment management facility 102 in response to payment request detection 304. For example, payment management facility 102 may perform operations 306-312 in response to payment request detection 304 without requiring further input from user 204. Accordingly, user 204 may select payment option 408, and, in response, payment management facility 102 may automatically submit pre-configured inaudible payment information to merchant device 206 to effect payment in a transaction between user 204 and merchant 208, without requiring any further input from user 204.

Merchant device 206 may be implemented in any suitable way, including as a single standalone computing device, as part of a merchant computing system, or as a set of standalone computing devices. In certain examples, merchant device 206 may be a single computing device configured to perform one or more of the merchant device operations described herein (e.g., voice call and connection operations, voice call payment operations, and payment processing operations). In other examples, merchant device 206 may include a set of multiple computing devices (e.g., multiple physical, standalone devices) configured to perform one or more of the merchant device operations described herein (e.g., a first merchant device that performs voice call and connection operations and a second merchant device that performs voice call payment operations and payment processing operations, or a first merchant device that performs voice call and connection operations, a second merchant device that performs voice call payment operations, and a third merchant device that performed payment processing operations).

Figure 9:
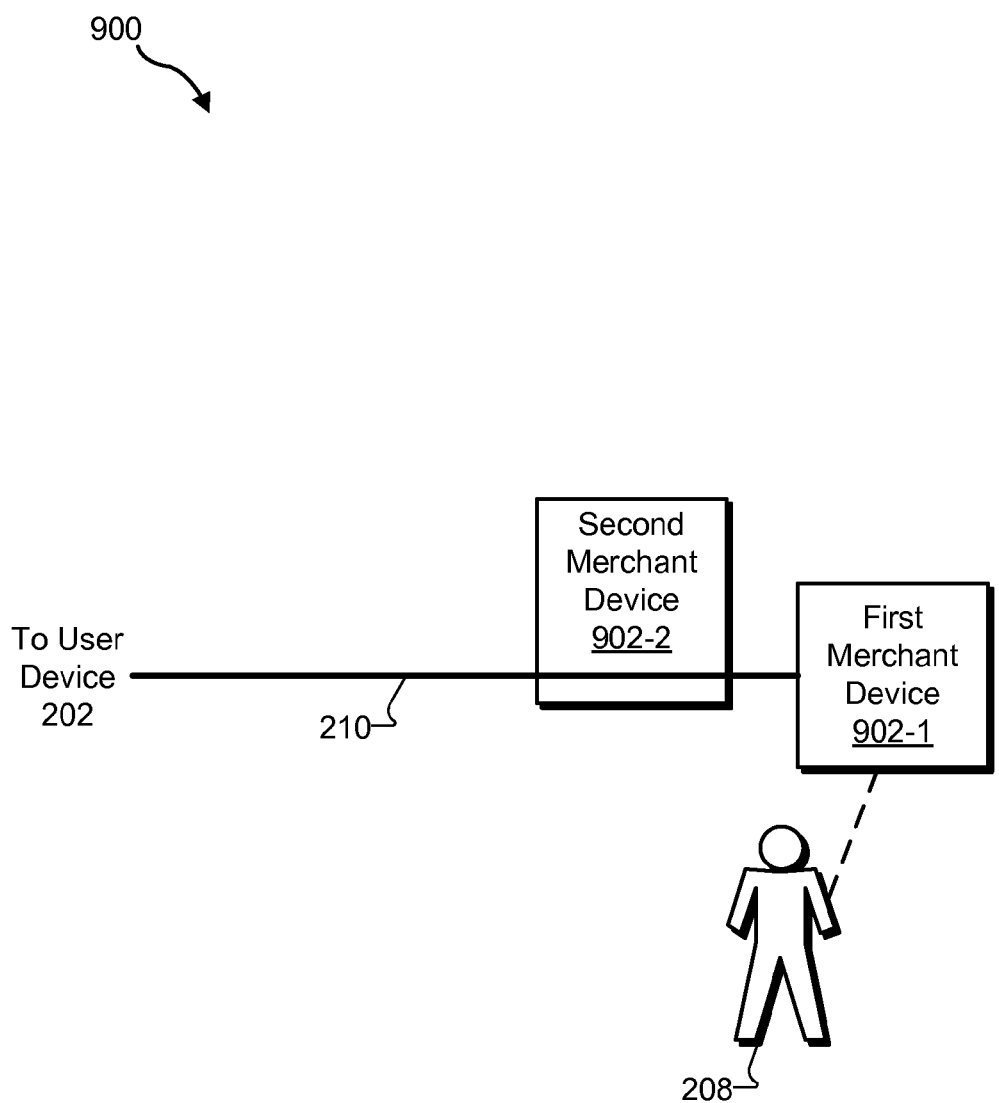
FIG. 9 illustrates an exemplary merchant device configuration according to principles described herein.

FIG. 9 illustrates an exemplary merchant device configuration 900. As shown, merchant device configuration 900 may include a first merchant device 902-1 that functions as an endpoint for active voice connection 210 (and the voice call supported by active voice connection 210). First merchant device 902-1 may perform voice call and connection operations. Merchant device configuration 900 may also include a second merchant device 902-2 that is disposed in-line with active voice connection 210 between user device 202 and merchant device 206. This placement of second merchant device 902-2 in-line with the active voice connection 210 may facilitate second merchant device 902-2 performing one or more of the voice call payment operations described herein, including, for example, detecting a request, transmitted by user device 202 over active voice connection 210, to verify that merchant 208 is equipped to receive inaudible payment information over active voice connection 210, transmitting a verification that merchant 208 is appropriately equipped to user device 202 over active voice connection 210, receiving inaudible payment information from user device 202 over active voice connection 210, and processing the inaudible payment information as payment in a transaction between user 204 and merchant 208, such as described herein.

In certain examples, second merchant device 902-2 may be configured to communicate with payment service system 802 over a wide area network. For example, second merchant device 902-2 may be an LTE-enabled device configured to communicate with payment service system 802 over an LTE network.

Returning to FIG. 3, user device 202 and/or merchant device 206 may terminate the voice call at voice call termination 314. The termination of the voice call may include deactivating, tearing down, or otherwise terminating active voice connection 210.

In certain examples, payment management facility 102 may direct user device 202 and/or merchant device 206 to perform one or more operations to secure inaudible payment information transmitted over active voice connection 210. Such operations may create a secure channel over active voice connection 210 by way of which inaudible payment information may be transmitted. For implementations in which security measures are already employed to secure traffic and/or signals transmitted over active voice connection 210, the operations performed by payment management facility 102 to further secure the privacy of the inaudible payment information may add a layer of security to the existing security measures that are in place for active voice connection 210. For example, if traffic transmitted over active voice connection 210 is encrypted, payment management facility 102 may add an additional layer of encryption for inaudible payment information transmitted over active voice connection 210.

Payment management facility 102 may direct user device 202 and/or merchant device 206 to secure inaudible payment information transmitted over active voice connection 210 in any suitable way. For example, payment management facility 102 may direct user device 202 and/or merchant device 206 to perform one or more operations to encrypt the inaudible payment information for transmission over active voice connection 210. Payment management facility 102 may be configured to use any suitable data encryption technologies, such as symmetric and/or asymmetric encryption technologies like Diffie-Hellman and RSA encryption technologies.

Figure 10:
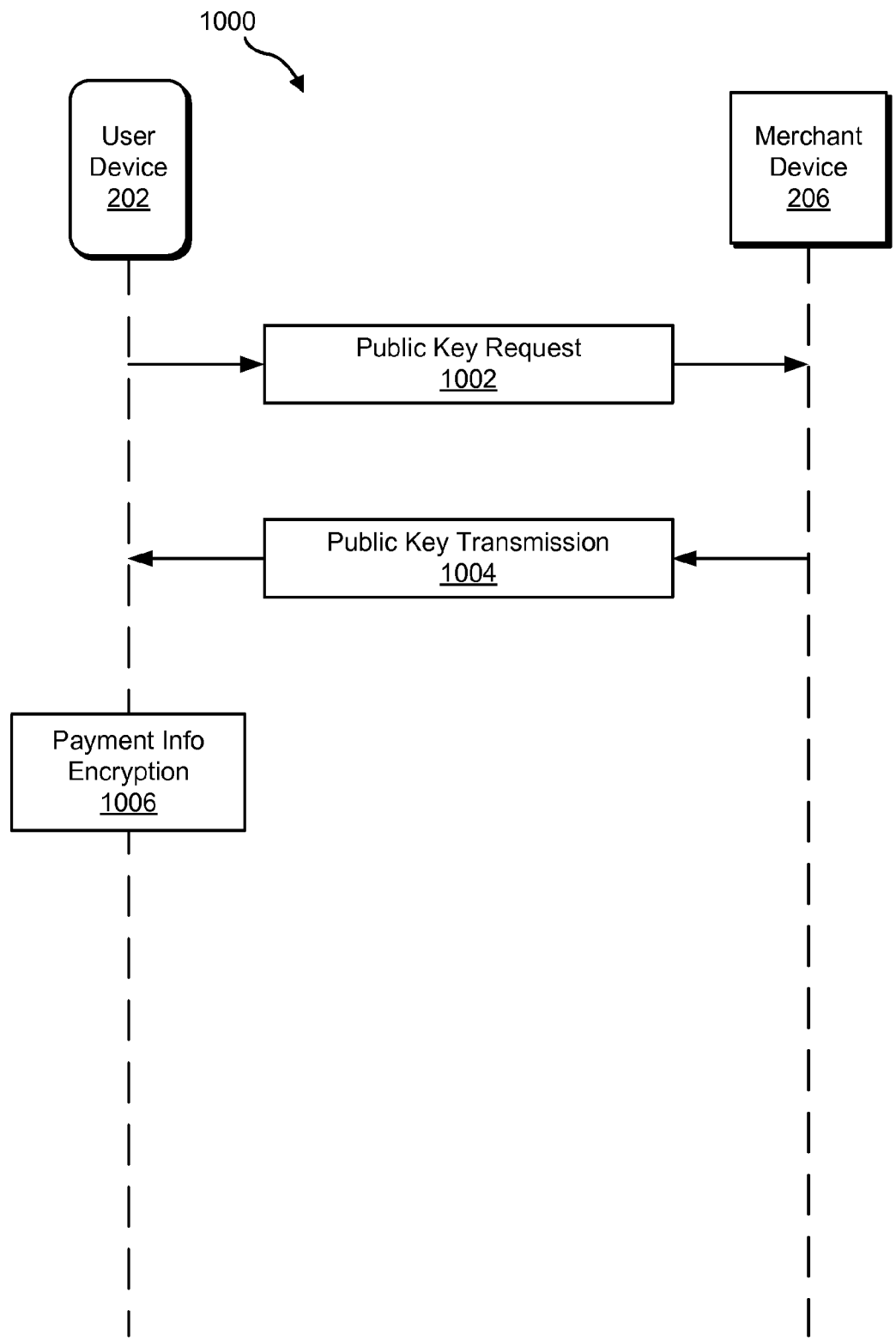
FIG. 10 illustrates an exemplary operational flow according to principles described herein.

To illustrate one example, user device 202 and merchant device 206 may exchange a public key, which may be used by user device 202 to generate and use a session key to encrypt inaudible payment information for transmission over active voice connection 210. FIG. 10 shows an exemplary operational flow 1000 in which payment management facility 102 directs user device 202 to transmit a request for a public key to merchant device 206 over active voice connection 210 at public key request 1002. At public key transmission 1004, payment management facility 102 directs merchant device 206 to transmit a public key to user device 202 in response to the request. Payment management facility 102 may then direct user device 202 to use the received public key and a private key maintained by user device 202 to generate a secret key and to use the secret key to encrypt inaudible payment information at payment information encryption 1006. After merchant device 206 receives the encrypted inaudible payment information over active voice connection 210, payment management facility 102 may direct merchant device 206 to use the secret key (computed from the public key and a private key maintained by merchant device 206) to decrypt the inaudible payment information.

In certain examples, the public key may be a merchant identification associated with merchant 208, such as a merchant identification used to identify the merchant 208 in a payment service system such as payment service system 802.

In certain examples, payment management facility 102 may direct user device 202 and/or merchant device 206 to perform one or more operations to secure the privacy of inaudible payment information transmitted over active voice connection 210 at any suitable point within operational flow 300 shown in FIG. 3. For example, such operations, including the operations of operational flow 1000 shown in FIG. 10, may be performed prior to and/or as part of payment information transmission 310 of operational flow 300.

In certain examples, user 204 may request the public key by speaking a request for the public key to a representative of merchant 208 over the voice call supported by active voice connection 210. In certain examples, the representative of merchant 208 may speak the public key to user 204 over the voice call supported by active voice connection 210. In other examples, the request for the public key and/or the public key may be shared over active voice connection 210 without being spoken aloud by user 204 and/or a representative of merchant 208.

In addition or alternative to systems and methods that allow parties to a voice call to share payment information over an active voice connection supporting the voice call as described herein, exemplary systems and methods described herein may allow parties to a voice call to share purchase information over an active voice connection supporting the voice call in a private, secure manner. This may be accomplished without the purchase information having to be spoken aloud or touch-toned (i.e., by pressing buttons to generate audible tones of different pitch) into a telephone device of the party providing the purchase information. Compared to conventional voice call purchase options such as speaking or touch-toning purchase information into a telephone device, systems and methods described herein may provide improved security, accuracy, and/or convenience in the communicating of purchase information over an active voice connection supporting a voice call.

As an example, a user of a user device, such as a mobile phone device, may use the user device to place a voice call to a merchant (e.g., a pizza delivery company) to order and pay for an item (e.g., a pizza). During a voice call between the user and a representative of the merchant, the user may verbally place the order. Instead of speaking or touch-toning purchase information to the user over the voice call, the merchant representative may use one or more of features provided by systems and methods described herein to provide inaudible purchase information to the user over an active voice connection supporting the voice call. The user may receive the inaudible purchase information over the active voice connection supporting the voice call and use it to effect payment for the order. In certain examples, the user may effect payment for the order without sharing actual payment information with the merchant. This may reduce the risk of the payment information being exposed to and misused by a person with malicious intent.

As used herein, "purchase information" may refer to any information about a purchase or potential purchase of goods and/or services that may be communicated from a merchant to a consumer. For example, purchase information may include any purchase order information for a specific order of goods and/or services. The purchase information may include information to aid the consumer in remitting payment for a transaction to the merchant. Examples of purchase information include, but are not limited to, a listing of goods and/or services, agreed prices for the goods and/or services, a listing of payment methods accepted by the merchant, and information about the merchant (e.g., one or more merchant identifiers such as merchant identifications used by identify the merchant to one or more third-party payment service systems).

As used herein, "inaudible purchase information" refers to purchase information that may be communicated from a merchant to a consumer over an active voice connection supporting a voice call between the merchant and the consumer and that may be provided for transmission over the active voice connection without relying on audible signals such as spoken or touch-toned audio signals. For example, inaudible purchase information may include, but is not limited to, digital data representing purchase information (e.g., digital data stored in computer memory and representing purchase information, digital data manually input by a merchant representative and representing purchase information, etc.), and one or more digital images representing purchase information (e.g., a photo image of a purchase order or invoice).

In examples in which inaudible purchase information is shared over an active voice connection supporting a voice call, payment data 106 may include or be replaced by purchase data representing the purchase information in system 100 of FIG. 1. Payment management facility 102 may be configured to perform one or more operations to facilitate sharing of inaudible purchase information over an active voice connection supporting a voice call, such as described herein.

Figure 11:
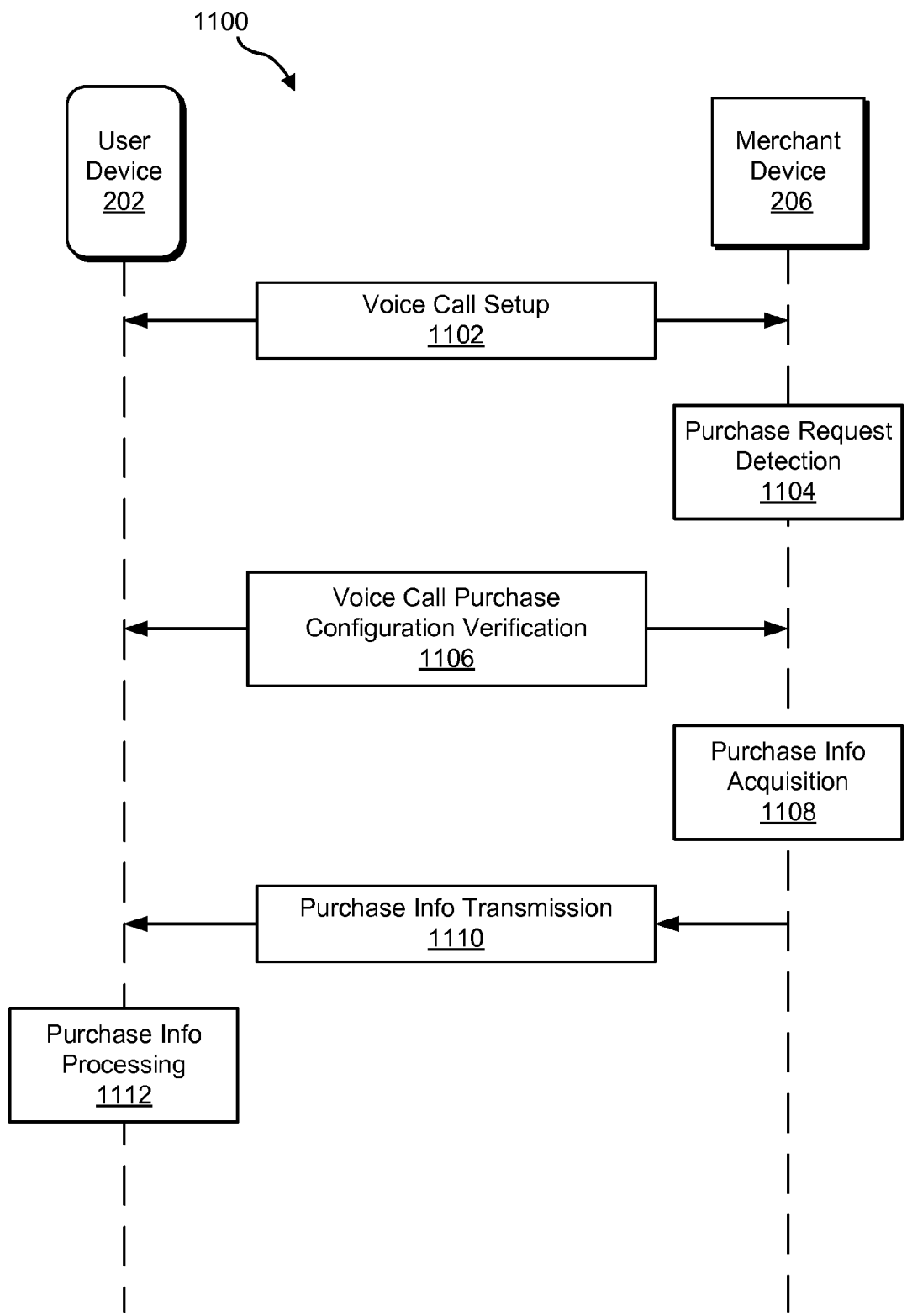
FIG. 11 illustrates an exemplary operational flow according to principles described herein.

With system 200 configured as shown in FIG. 2, payment management facility 102 may direct user device 202 and/or merchant device 206 to perform one or more operations to facilitate a voice call payment over active voice connection 210, the operations including sharing inaudible purchase information over an active voice connection supporting a voice call between user 204 and merchant 208. FIG. 11 illustrates part of an exemplary operational flow 1100 for such a voice call payment.

At voice call setup 1102, user device 202 and merchant device 206 establish a voice call between user 204 and merchant 208. The establishment of the voice call includes user device 202 and merchant device 206 establishing active voice connection 210 between user device 202 and merchant device 206 to support the voice call. Active voice connection 210 and the voice call may be established at voice call setup 1102 in any suitable way and using any suitable voice call and/or voice connection technologies, such as described herein.

At purchase request detection 1104, payment management facility 102 detects a request provided by merchant 208, through merchant device 206, to submit inaudible purchase information to user 204 over active voice connection 210 to request payment in a transaction between user 204 and merchant 208. For example, during the established voice call between user 204 and a representative of merchant 208 (e.g., during a conversation between user 204 and a representative of merchant 208 regarding an order for goods or services or another potential transaction between user 204 and merchant 208), payment management facility 102 may detect a request by merchant 208 to submit inaudible purchase information to user 202 over active voice connection 210 as a request for payment in a transaction between user 204 and merchant 208.

Merchant 208 may provide the request to submit inaudible purchase information to user 202 in any suitable way, such as by providing input indicating the request to merchant device 206. To this end, payment management facility 102 may direct merchant device 206 to provide one or more features for use by merchant 208 to provide the request. For example, payment management facility 102 may direct merchant device 206 to provide one or more GUI views and/or one or more features of a GUI view for display by merchant device 206 during the voice call. Such features of a GUI view may facilitate merchant 206 providing inaudible purchase information to merchant device 206 without relying on audible signals to provide the information (e.g., without speaking or touch-toning the information).

In response to detecting the request at purchase request detection 1104, payment management facility 102 may direct user device 202 and/or merchant device 206 to perform one or more operations to facilitate transmission of the inaudible purchase information from merchant device 202 to user device 206 over active voice connection 210. For example, at voice call purchase configuration verification 1106, payment management facility 102 may direct merchant device 202 to verify that user 202 is equipped to receive and process inaudible purchase information. For instance, payment management facility 102 may direct user device 204 to transmit a predetermined signal to user device 202 over active voice connection 210. The predetermined signal may be any signal that may be generated by merchant device 206, transmitted over active voice connection 210, and received by user device 202. For example, the predetermined signal may include a predetermined audio signal such as a predefined set of audio tones.

Payment management facility 102 may direct user device 202 to detect the predetermined signal transmitted by merchant device 206 over active voice connection 210. In response to detecting receipt of the predetermined signal, payment management facility 102 may direct user device 202 to transmit an acknowledgement to merchant device 206 over active voice connection 210 to indicate to merchant device 206 that user device 202 is equipped to receive and process inaudible purchase information.

Payment management facility 102 may direct merchant device 206 to detect the acknowledgement transmitted by user device 202 over active voice connection 210 and to interpret the acknowledgement as verification that user device 202 is equipped to receive and process inaudible purchase information.

While voice call purchase configuration verification 1106 may be performed in response to purchase request detection 1104 in certain examples, in other examples voice call purchase configuration verification 1106 may be omitted from an operational flow for a voice call payment or performed prior to purchase request detection 1104 in an operational flow for voice call payment. For example, in certain alternative examples, voice call purchase configuration verification 1106 may be performed as part of voice call setup 1102 or in response to voice call setup 1102.

At purchase information acquisition 1108, payment management facility 102 may direct merchant device 206 to acquire inaudible purchase information for transmission over active voice connection 210. Payment management facility 102 may direct merchant device 206 to acquire the inaudible purchase information in any suitable way. As an example, payment management facility 102 may direct merchant device 206 to retrieve data representative of the inaudible purchase information from a non-transitory computer-readable medium, such as from local memory of merchant device 206. For instance, if a representative of merchant 208 has input purchase information into merchant device 206 during the voice call and/or if payment management facility 102 has been preconfigured to use specific pre-stored inaudible purchase information, payment management facility 102 may direct merchant device 206 to retrieve data representative of the inaudible purchase information from local memory of merchant device 206.

As another example, payment management facility 102 may direct merchant device 206 to prompt merchant 208 to input inaudible purchase information into merchant device 206. The prompt may be in any suitable form, such as an indication that merchant device 206 is ready to receive inaudible purchase information input, instructions indicating how merchant 208 may input inaudible purchase information to merchant device 206, and/or a menu of options each selectable by merchant 204 to select inaudible purchase information particular purchase information to be included in the inaudible purchase information (e.g., purchase information for a particular payment option agreed to by user 204 and merchant 208 during the voice call). For instance, if payment management facility 102 has been preconfigured and/or merchant device 206 stores data representative of inaudible purchase information for various payment options, payment management facility 102 may direct merchant device 206 to display a GUI view and includes menu options each selectable by merchant 208 to select one or more payment options for inclusion in inaudible purchase information for a transaction.

At purchase information transmission 1110, payment management facility 102 may direct merchant device 206 to transmit the inaudible purchase information to user device 202 over active voice connection 210. Merchant device 206 may transmit the inaudible purchase information to user device 202 over active voice connection 210 in any of the exemplary ways described herein or in any other suitable manner. In certain examples, payment management facility 102 may direct merchant device 206 and/or user device 202 to perform one or more operations to secure the inaudible purchase information transmitted over active voice connection 210, such as by encrypting the inaudible purchase information for transmission.

User device 202 may receive the inaudible purchase information from merchant device 206 over active voice connection 210. In response, payment management facility 102 may direct user device 202 to perform one or more operations to process the inaudible purchase information at purchase information processing 1112. In certain examples, the processing of the inaudible purchase information at purchase information processing 1112 may include performing one or more operations to verify the validity of the inaudible purchase information and/or to present the inaudible purchase information to user 204.

After purchase information processing 1112, user 204 may choose to effect payment in the transaction specified by the purchase information. In certain examples, user 204 may provide input to indicate a request to provide payment information to merchant 206. In response, payment management facility 102 may direct user device 202 and/or merchant device 206 to perform one or more operations of operation flow 300 shown in FIG. 3 to facilitate transmission of inaudible payment information from user device 202 to merchant device 206 for use by merchant to process payment for the transaction.

Figure 12:
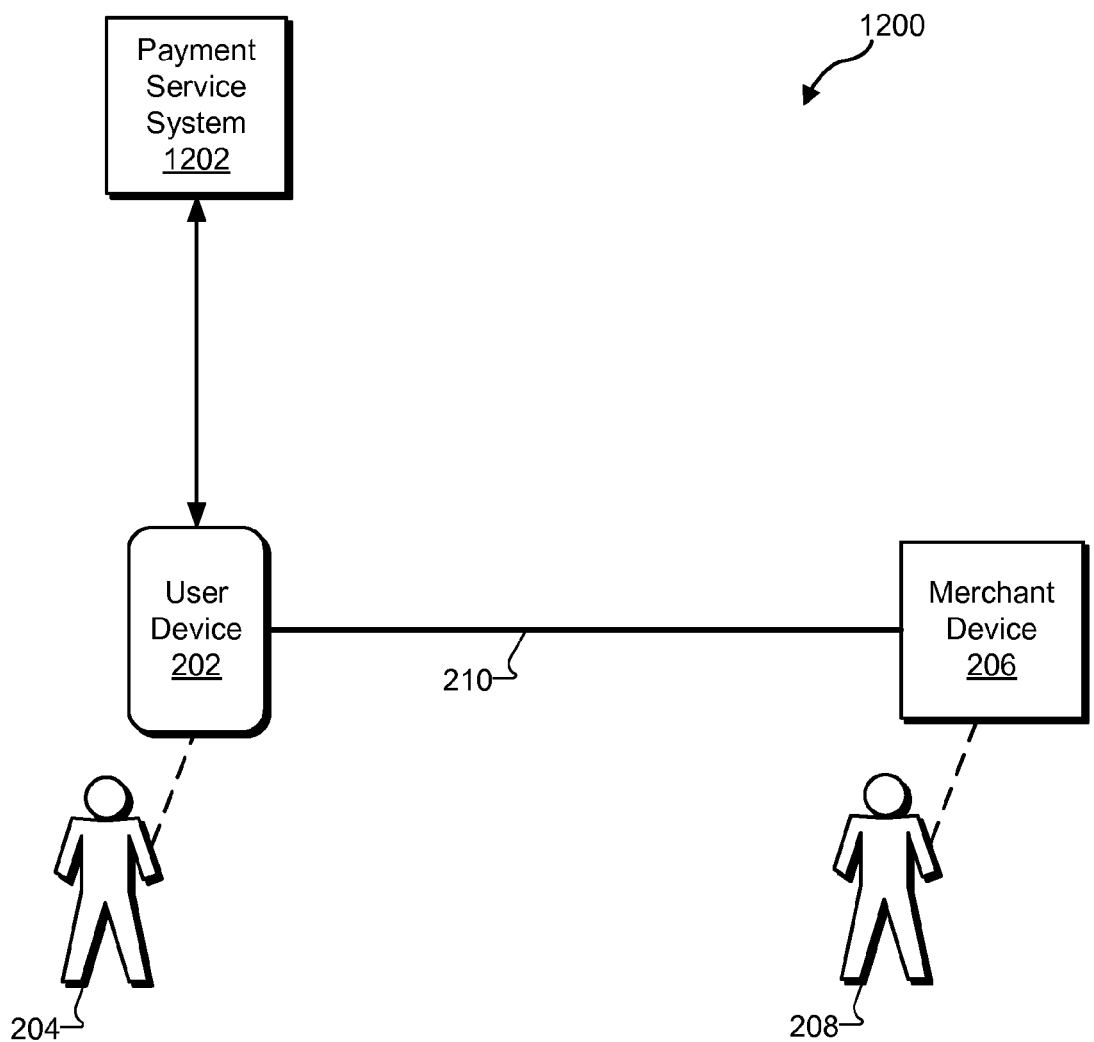
FIG. 12 illustrates an exemplary voice call payment system according to principles described herein.

In other examples, user 204 may use the received inaudible purchase information to submit a request to issue payment for the transaction specified by the inaudible purchase information to a third-party payment service system. To illustrate, FIG. 12 shows an exemplary voice call payment system 1200 ("system 1200") that implements system 100. System 1200 may be as system 200 and may additionally include a payment service system 1202, which may be a server system operated by a third party that provides a payment service. For instance, payment service system 1202 may include a server system operated by a payment card service provider.

User device 202 and payment service system 1202 may communicate one with another over any suitable connection, such as a connection over a wide area network (e.g., the Internet, an LTE data network or other wireless data network, etc.).

Figure 13:
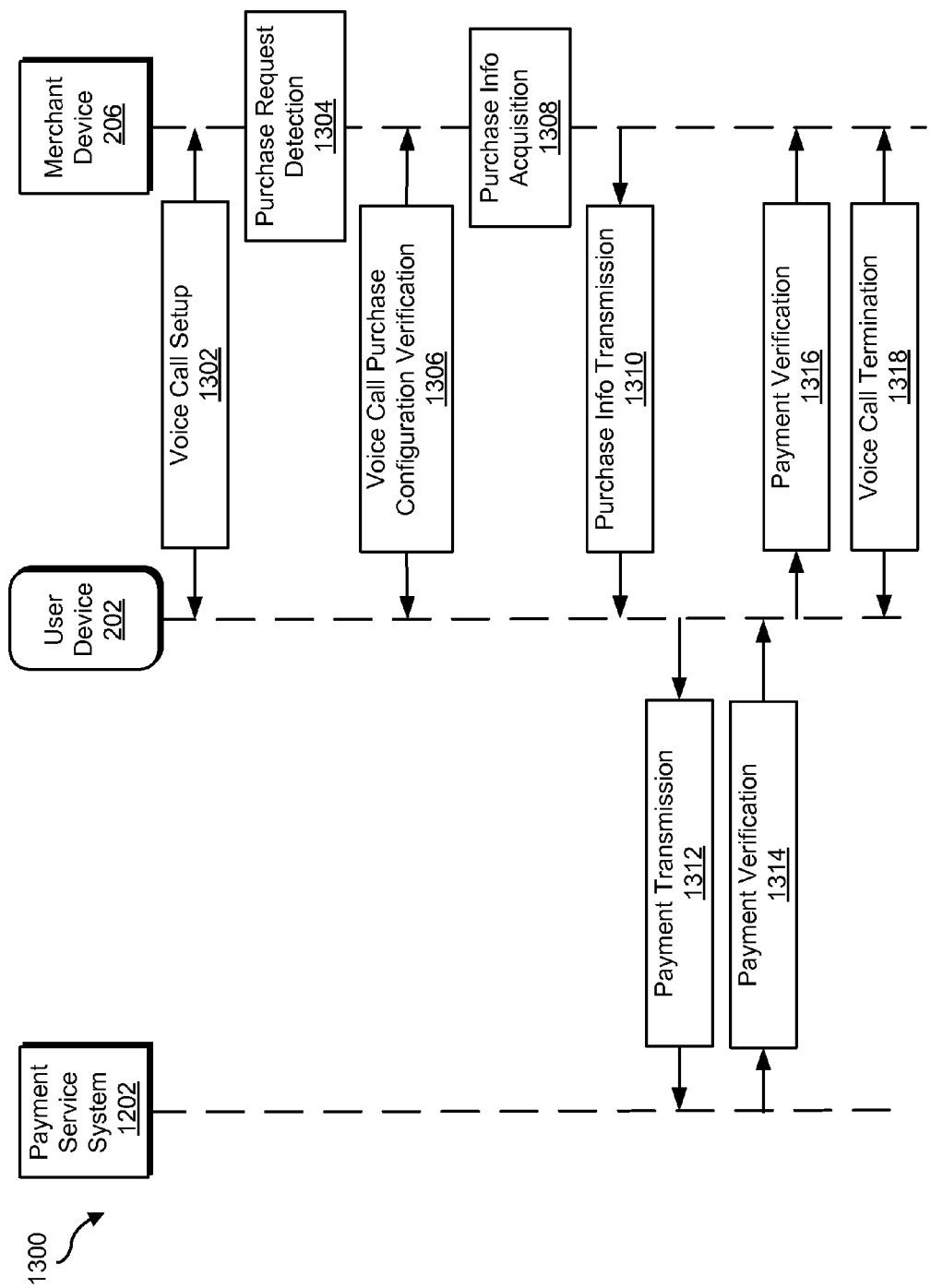
FIG. 13 illustrates an exemplary operational flow according to principles described herein.

With system 1200 configured as shown in FIG. 12, payment management facility 102 may direct user device 202 and/or merchant device 206 to perform one or more operations to facilitate a voice call payment over active voice connection 210. FIG. 13 illustrates an exemplary operational flow 1300 for such a voice call payment.

Operations 1302-1310 of operational flow 1300 may be performed as operations 1102-1110 of operational flow 1100 shown in FIG. 11 such that user device 202 receives inaudible purchase information from merchant device 206. At payment transmission 1312, payment management facility 102 may direct user device 202 to transmit a request for payment of a transaction specified by the inaudible purchase information to payment service system 1202. The request may include any information useful by payment service system 1202 to effect payment for the transaction from user 204 to merchant 208. For example, the request may include any of the inaudible purchase information received by user device 202 and any information identifying user 204, user device 202, and/or an account of user 204 with a payment service provided by payment service system 1202.

Payment service system 1202 may process the request, which may include payment service system 1202 authenticating user 204, user device 202, the account of user 204 with the payment service, and that sufficient funds are available to make the payment. Payment service system 1202 may then issue the payment and transmit a payment verification to user device 202 at payment verification 1314.

User device 204 may receive the payment verification and forward the payment verification to merchant device 206 over active voice connection 210 at payment verification 1316. Merchant device 206 may receive and process the payment verification such that merchant 208 may verify that payment for the transaction has been made by user 204 through the payment service provided by payment service system 1202. The voice call may be terminated at voice call termination 1318.

Operation flow 1300 may be performed to effect payment for a transaction between user 204 and merchant 208 without actual payment information being shared with merchant 208. This may reduce the risk of the payment information being exposed to someone with malicious intent.

Figure 14:
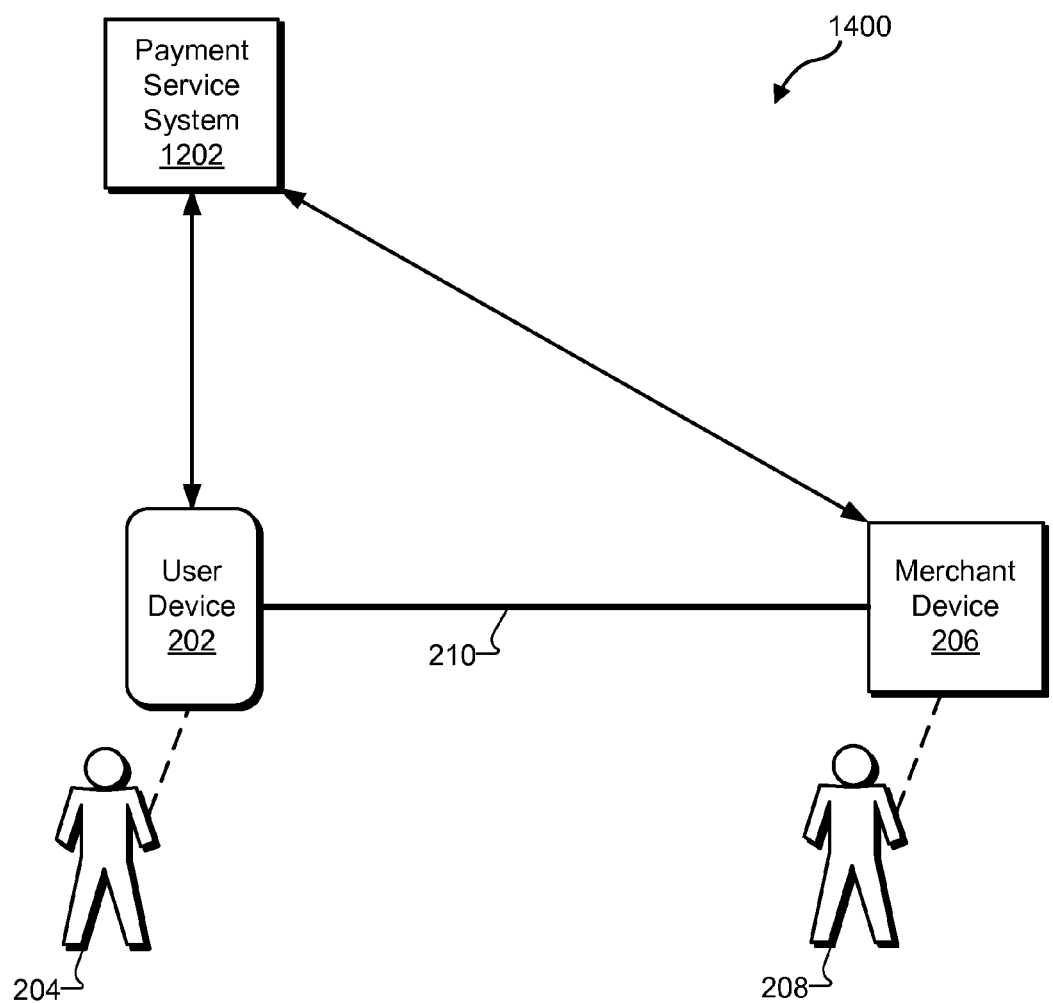
FIG. 14 illustrates an exemplary voice call payment system according to principles described herein.

While operational flow 1300 includes user device 202 receiving and forwarding payment verification, in other examples, payment verification may be provided by payment service system 1202 to merchant device 206 without going through user device 202. To illustrate, FIG. 14 shows an exemplary voice call payment system 1400 ("system 1400") that implements system 100. System 1400 may be as system 1200 and may additionally include payment service system 1202 and merchant device 206 being communicatively coupled one to another. Merchant device 206 and payment service system 1402 may communicate one with another over any suitable connection, such as a connection over a wide area network (e.g., the Internet, an LTE data network or other wireless data network, etc.).

Figure 15:
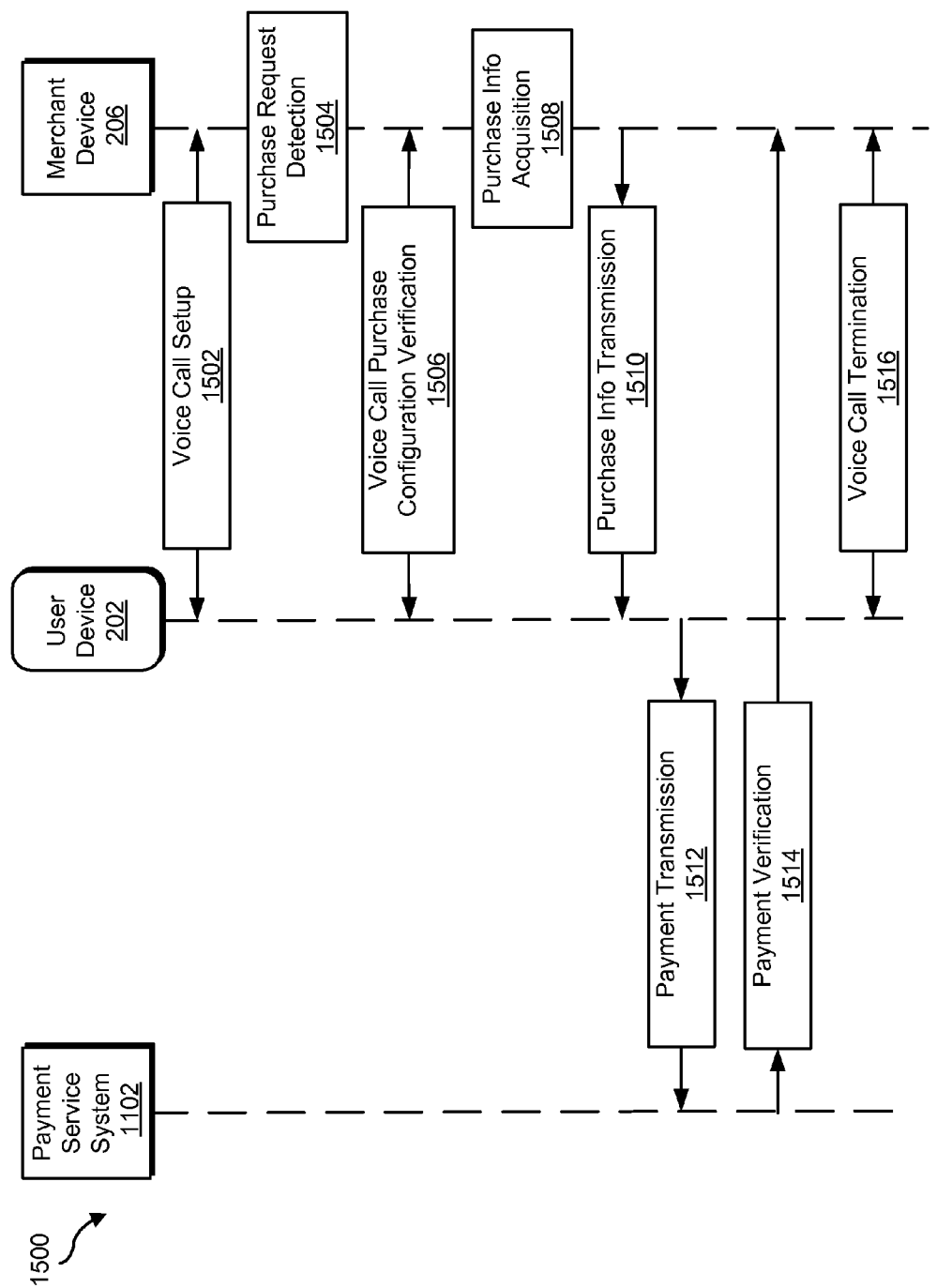
FIG. 15 illustrates an exemplary operational flow according to principles described herein.
Figure 16:
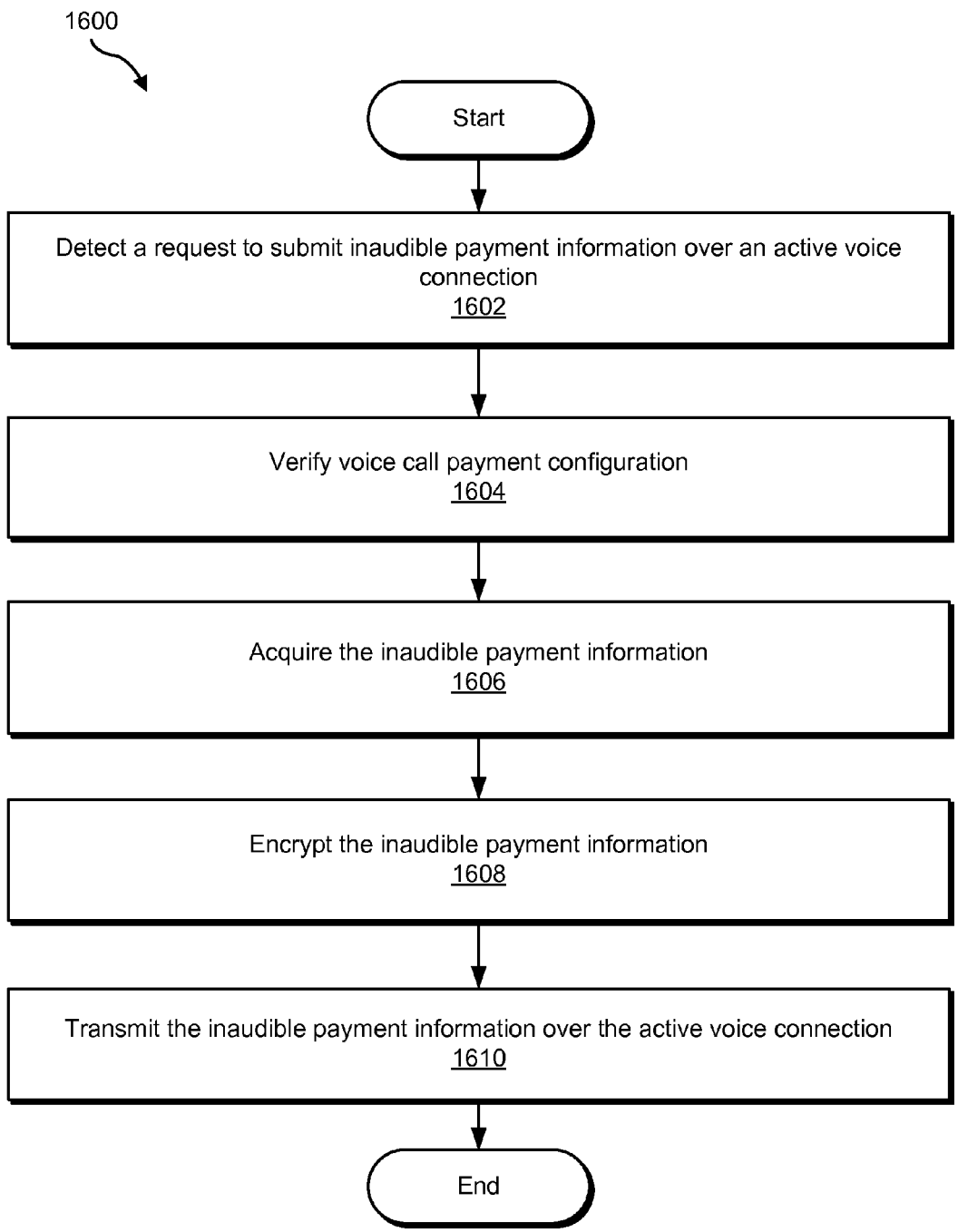
FIGS. 16-19 illustrate exemplary voice call payment methods according to principles described herein.
Figure 17:
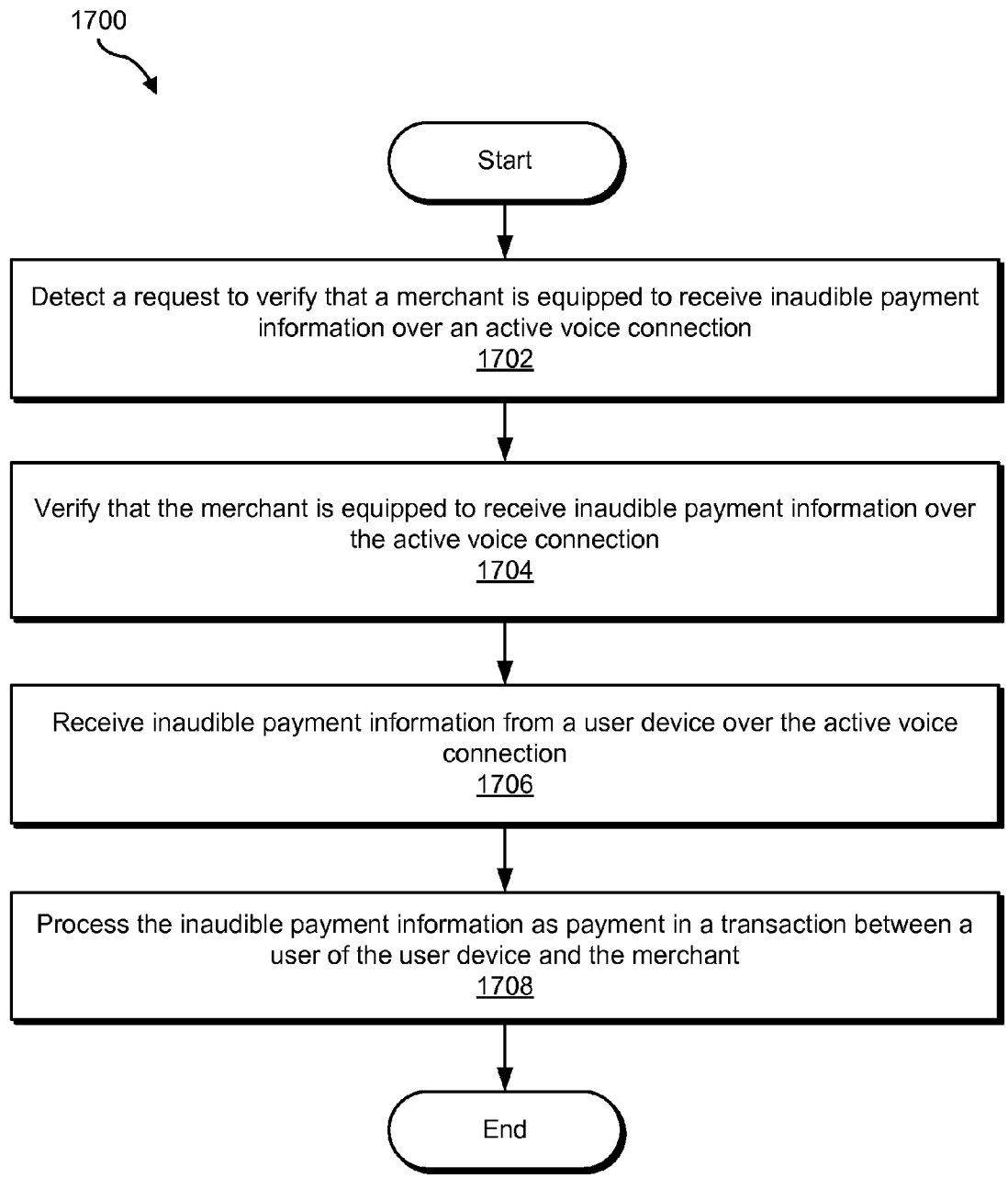
Figure 18:
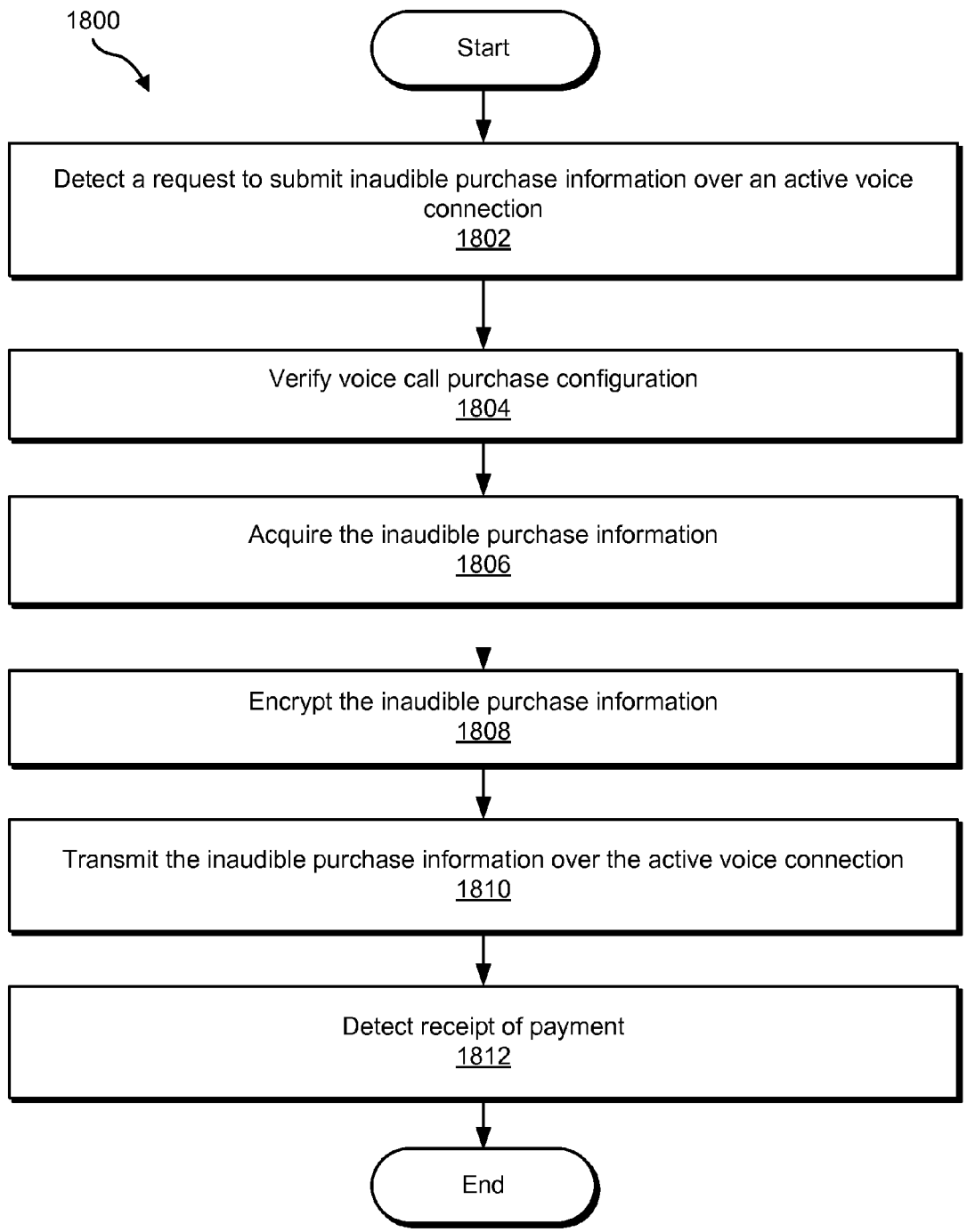
Figure 19:
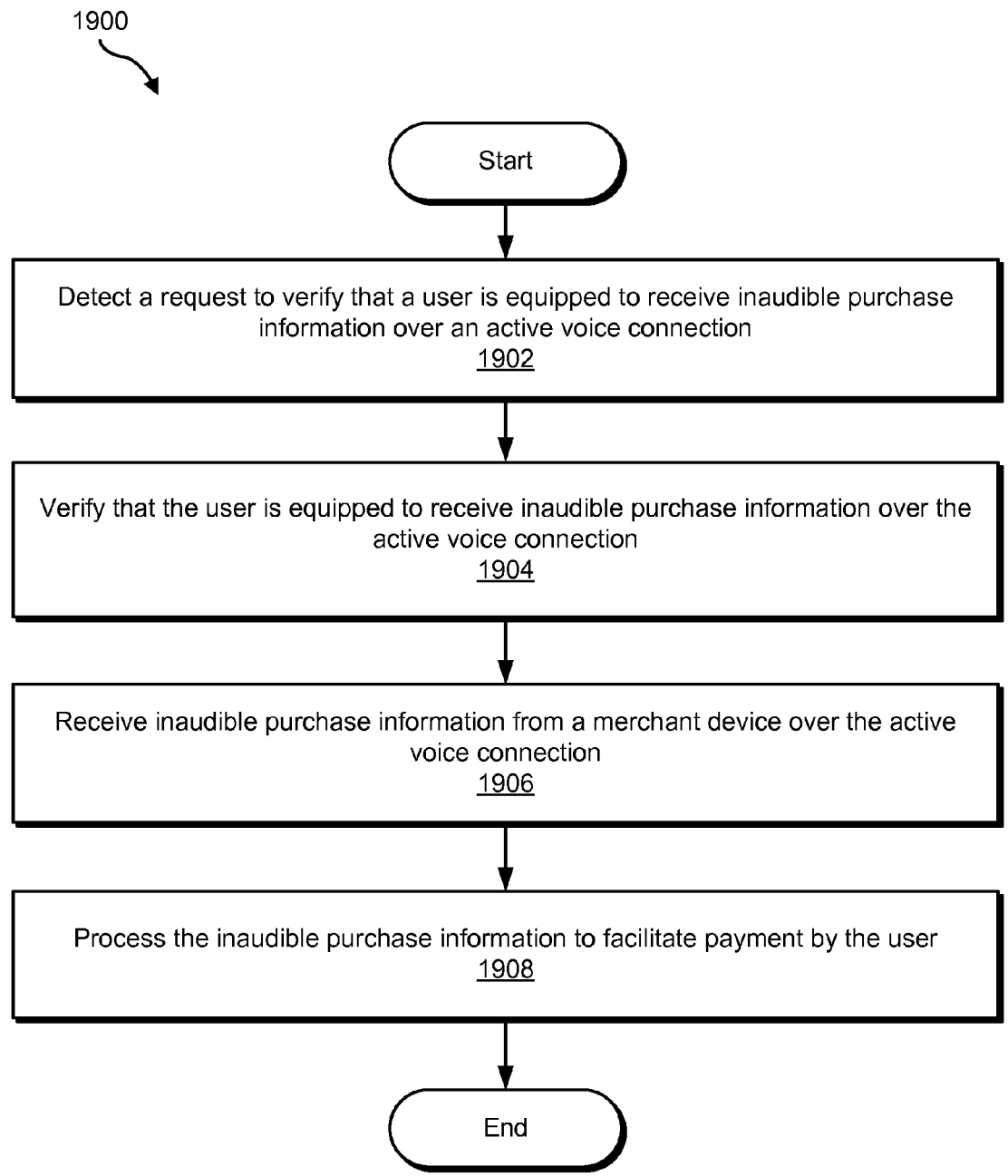

With system 1400 configured as shown in FIG. 14, payment management facility 102 may direct user device 202 and/or merchant device 206 to perform one or more operations to facilitate a voice call payment over active voice connection 210. FIG. 15 illustrates an exemplary operational flow 1500 for such a voice call payment.

Operations of operational flow 1500 may be performed as operations of operational flow 1100 shown in FIG. 11 except that instead of payment verification being transmitted from payment service system 1202 to user device 202 at payment verification 1314 and then from user device 202 to merchant device 206 at payment verification 1316, payment verification may be transmitted directly from payment service system 1202 to merchant device 206 at payment verification 1514.

Merchant device 206 may receive and process the payment verification such that merchant 208 may verify that payment for the transaction has been made by user 204 through the payment service provided by payment service system 1202. The voice call may be terminated at voice call termination 1516.

Operation flow 1500 may be performed to effect payment for a transaction between user 204 and merchant 208 without actual payment information being shared with merchant 208 and without payment verification having to be received from user 204. This may reduce the risk of the payment information being exposed to someone with malicious intent and/or the risk of receiving a fraudulent payment verification.

FIGS. 16-19 illustrate exemplary voice call payment methods 1600-1900. While FIGS. 16-19 illustrate exemplary steps according to certain embodiments, other embodiments may omit, add to, reorder, combine, and/or modify any of the steps shown in FIGS. 16-19. One or more of the steps shown in FIGS. 16-19 may be performed by any of the exemplary systems described herein and/or any elements and/or implementations thereof.

Turning to method 1600, in step 1602, a system detects a request to submit inaudible payment information over an active voice connection, such as described herein. For example, during a voice call between a user of a user device and a representative of a merchant over an active voice connection between the user device and a merchant device of the merchant, the system may detect a request by the user to submit inaudible payment information to the merchant over the active voice connection as payment in a transaction between the user and the merchant.

In step 1604, the system verifies a voice call payment configuration, such as described herein. For example, the system may verify that the merchant is equipped to receive and process the inaudible payment information, such as described herein.

In step 1606, the system acquires the inaudible payment information. For example, the system may direct the user device to acquire the inaudible payment information in any of the ways described herein.

In step 1608, the system encrypts the acquired inaudible payment information, such as described herein.

In step 1610, the system transmits the inaudible payment information over the active voice connection. For example, the system may direct the user device to transmit the inaudible payment information to the merchant device over the active voice connection.

Turning to method 1700, in step 1702, a system detects a request to verify that a merchant is equipped to receive inaudible payment information over an active voice connection. For example, the system may detect a request, received by a merchant device, to verify that the merchant device is configured to receive inaudible payment information over an active voice connection, such as described herein.

In step 1704, the system verifies that the merchant is equipped to receive inaudible payment information over the active voice connection. For example, the system may direct the merchant device to transmit a verification, such as an acknowledgement, to the user device over the active voice connection to verify that the merchant is equipped to receive inaudible payment information over the active voice connection.

In step 1706, the system receives inaudible payment information from the user device over the active voice connection, such as described herein.

In step 1708, the system processes the inaudible payment information as payment in a transaction between a user of the user device and the merchant, such as described herein.

Turning to method 1800, in step 1802, a system detects a request to submit inaudible purchase information over an active voice connection, such as described herein. For example, during a voice call between a user of a user device and a representative of a merchant over an active voice connection between the user device and a merchant device of the merchant, the system may detect a request by the merchant to submit inaudible purchase information to the user over the active voice connection as a request for payment in a transaction between the user and the merchant.

In step 1804, the system verifies a voice call payment configuration, such as described herein. For example, the system may verify that the user is equipped to receive and process the inaudible purchase information, such as described herein.

In step 1806, the system acquires the inaudible purchase information. For example, the system may direct the merchant device to acquire the inaudible purchase information in any of the ways described herein.

In step 1808, the system encrypts the acquired inaudible purchase information, such as described herein.

In step 1810, the system transmits the inaudible purchase information over the active voice connection. For example, the system may direct the merchant device to transmit the inaudible purchase information to the user device over the active voice connection.

In step 1812, the system detects receipt of payment from user for the transaction. For example, the system directs the merchant device to detect receipt of inaudible payment information from the user device, a payment verification from the user device, or a payment verification from a third-party payment service system, such as described herein.

Turning to method 1900, in step 1902, a system detects a request to verify that a user is equipped to receive inaudible purchase information over an active voice connection. For example, the system may detect a request, received by a user device, to verify that the user device is configured to receive inaudible purchase information over an active voice connection, such as described herein.

In step 1904, the system verifies that the user is equipped to receive inaudible purchase information over the active voice connection. For example, the system may direct the user device to transmit a verification, such as an acknowledgement, to the merchant device over the active voice connection to verify that the user is equipped to receive inaudible purchase information over the active voice connection.

In step 1906, the system receives inaudible purchase information from the merchant device over the active voice connection, such as described herein.

In step 1908, the system processes the inaudible purchase information to facilitate the user effecting payment to the merchant as part of a transaction specified by the inaudible purchase information, such as described herein.

In certain embodiments, one or more of the processes, methods, and/or operations described herein may be implemented at least in part as instructions embodied in a non-transitory computer-readable medium and executable by one or more computing devices. In general, a physical processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 20:
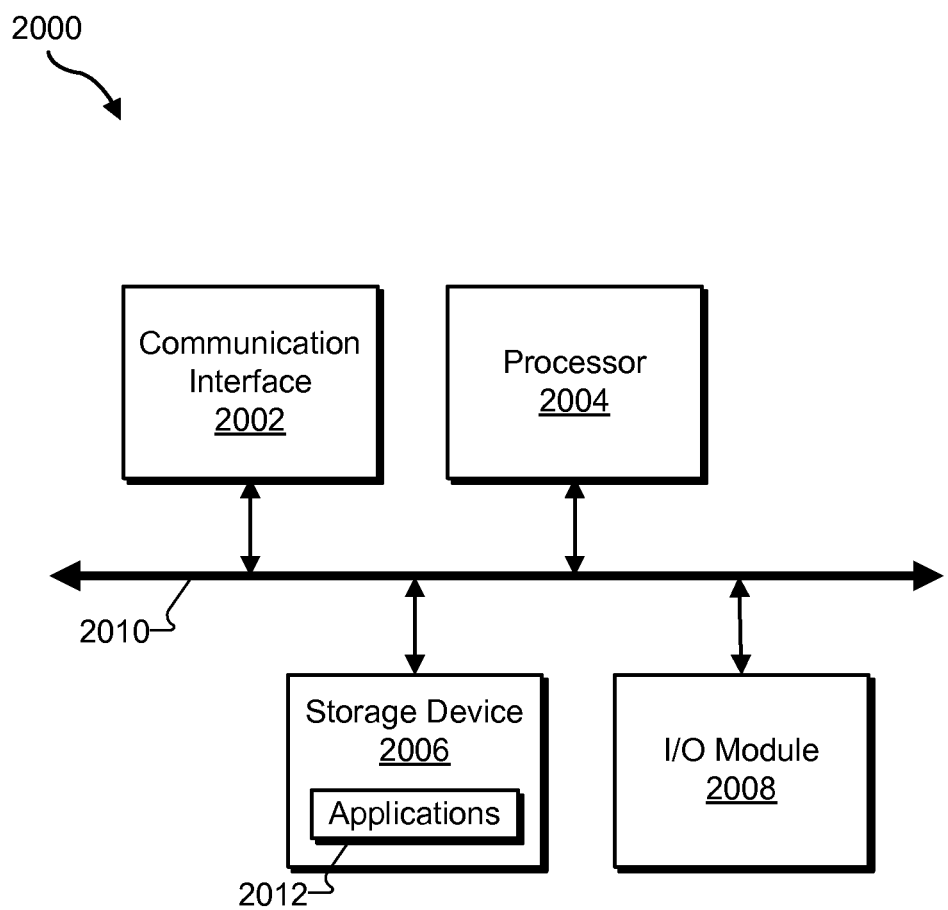
FIG. 20 illustrates an exemplary computing device according to principles described herein.

FIG. 20 illustrates an exemplary computing device 2000 that may be configured to perform one or more of the processes, methods, and/or operations described herein. As shown in FIG. 20, computing device 2000 may include a communication interface 2002, a processor 2004, a storage device 2006, and an input/output ("I/O") module 2008 communicatively connected via a communication infrastructure 2010. While an exemplary computing device 2000 is shown in FIG. 20, the components illustrated in FIG. 20 are not intended to be limiting. Additional, fewer, or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface. In certain examples, communication interface 2002 is configured to send and receive signals over an active voice connection and/or a voice call supported by an active voice connection.

Processor 2004 generally represents any type or form of processing unit (e.g., a physical processor) capable of processing data or interpreting, executing, and/or directing execution of one or more of the instructions, processes, and/or operations described herein. Processor 2004 may execute and/or direct execution of operations as directed by one or more applications 2012 or other computer-executable instructions such as may be stored in storage device 2006 or another computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 2006. For example, data representative of one or more applications 2012 configured to direct processor 2004 to perform any of the operations described herein may be stored within storage device 2006. In some examples, data may be arranged in one or more databases residing within storage device 2006.

I/O module 2008 may be configured to receive user input and provide user output and may include any hardware, firmware, software, or combination thereof supportive of input and output capabilities. For example, I/O module 2008 may include hardware and/or software for capturing user input, including, but not limited to, a keyboard or keypad, a touch screen component (e.g., touch screen display), a receiver (e.g., a radio frequency ("RF") or infrared receiver), and/or one or more input buttons.

I/O module 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2008 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 2000. For example, one or more applications 2012 residing within storage device 2006 may be configured to direct processor 2004 to perform one or more processes or operations associated with payment management facility 102. Likewise, storage facility 104 may be implemented by or within storage device 2006. Such an implementation may be referred to as a computer-implemented system, such as a computer-implemented voice call payment system.

One or more of the systems, methods, elements, operations, features, tools, etc. described herein may improve operation and/or performance of computing device 2000, such as by conserving processing and/or memory resources of computing device 2000 and/or by providing for efficient operation of computing device 2000, for example.

While certain examples described herein are directed to sharing inaudible purchase information and/or inaudible payment information over an active voice connection during a voice call, one or more principles described herein may be similarly applied to sharing any other sensitive information over an active voice connection during a voice call. For example, sensitive information such as personal information about user 204 and/or private to user 204 (e.g., a name, an address, contact information, security credentials, authentication credentials, etc.) may be shared over an active voice connection in any of the ways described herein.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    directing, by a voice call payment system and during a voice call between a user of a user device and a representative of a merchant over an active voice connection between the user device and a merchant device of the merchant, the user device to display, on a display screen of the user device during the voice call, a user-selectable payment option in a graphical user interface view, the graphical user interface view comprising a menu of voice call management options displayed together with the user-selectable payment option during the voice call;
    detecting, by the voice call payment system and during the voice call, a request by the user to submit inaudible payment information to the merchant over the active voice connection as payment in a transaction between the user and the merchant;
    directing, by the voice call payment system and in response to the request, the user device to acquire the inaudible payment information; and
    directing, by the voice call payment system and in response to the request, the user device to transmit the inaudible payment information to the merchant device over the active voice connection.

2. The method of claim 1,
    wherein the detecting of the request by the user to submit the inaudible payment information to the merchant comprises detecting a user selection of the user-selectable payment option in the graphical user interface view.

3. The method of claim 1, further comprising verifying, by the voice call payment system, that the merchant is equipped to receive and process the inaudible payment information by:

directing the user device to transmit a predetermined signal to the merchant device over the active voice connection; and detecting an acknowledgment received by the user device from the merchant device over the active voice connection.

4. The method of claim 1, wherein the directing of the user device to acquire the inaudible payment information comprises directing the user device to retrieve the inaudible payment information from local memory of the user device.

5. The method of claim 1, wherein the directing of the user device to acquire the inaudible payment information comprises directing the user device to prompt the user to input the inaudible payment information.

6. The method of claim 1, further comprising:
encrypting, by the voice call payment system, the acquired inaudible payment information;
wherein the directing of the user device to transmit the inaudible payment information comprises directing the user device to transmit the encrypted inaudible payment information to the merchant device over the active voice connection.

7. The method of claim 1, embodied as computer-executable instructions on at least one non-transitory computer-readable medium.

8. The method of claim 1, further comprising authenticating, by the voice call payment system, the user;
wherein the directing of the user device to display the user-selectable payment option in the graphical user interface is based on the authenticating of the user.

9. The method of claim 8, wherein the authenticating of the user comprises using one or more biometrics to authenticate the user.

10. A system comprising:
a physical processor; and
a payment management facility that directs the physical processor to:
direct, during a voice call between a user of a user device and a representative of a merchant over an active voice connection between the user device and a merchant device of the merchant, the user device to display, on a display screen of the user device during the voice call, a user-selectable payment option in a graphical user interface view, the graphical user interface view comprising a menu of voice call management options displayed together with the user-selectable payment option during the voice call;
detect, during the voice call, a request by the user to submit inaudible payment information to the merchant over the active voice connection as payment in a transaction between the user and the merchant;
direct, in response to the request, the user device to acquire the inaudible payment information; and
direct, in response to the request, the user device to transmit the inaudible payment information to the merchant device over the active voice connection.

11. The system of claim 10, wherein
the payment management facility directs the physical processor to detect the request by detecting a user selection of the user-selectable payment option in the graphical user interface view.

12. The system of claim 10, wherein the payment management facility directs the physical processor to verify that the merchant is equipped to receive and process the inaudible payment information by:

directing the user device to transmit a predetermined signal to the merchant device over the active voice connection; and detecting an acknowledgment received by the user device from the merchant device over the active voice connection.

13. The system of claim 10, wherein the payment management facility directs the physical processor to direct the user device to acquire the inaudible payment information by directing the user device to retrieve the inaudible payment information from local memory of the user device.

14. The system of claim 10, wherein the payment management facility directs the physical processor to direct the user device to acquire the inaudible payment information by directing the user device to prompt the user to input the inaudible payment information.

15. The system of claim 10, wherein:
the payment management facility directs the physical processor to encrypt the acquired inaudible payment information; and
the payment management facility directs the physical processor to direct the user device to transmit the inaudible payment information by directing the user device to transmit the encrypted inaudible payment information to the merchant device over the active voice connection.

16. A system comprising:
a physical processor; and
a payment management facility that directs the physical processor to:
detect, during a voice call between a user of a user device and a representative of a merchant over an active voice connection between the user device and a merchant device of the merchant, a request to verify that the merchant is equipped to receive inaudible payment information over the active voice connection, the request transmitted from the user device to the merchant device in response to a user selection of a user-selectable payment option in a graphical user interface view displayed on a display screen of the user device during the voice call, the graphical user interface view comprising a menu of voice call management options displayed together with the user-selectable payment option during the voice call;
direct, in response to the request, the merchant device to transmit, over the active voice connection, a verification that the merchant is equipped to receive the inaudible payment information over the active voice connection;
receive, after the directing of the merchant device to transmit the verification, the inaudible payment information from the user device over the active voice connection; and
process the inaudible payment information as payment in a transaction between the user and the merchant.

17. The system of claim 16, wherein the payment management facility directs the physical processor to:
detect the request to verify that the merchant is equipped to receive the inaudible payment information over the active voice connection by monitoring for a predetermined audible signal on the active voice connection; and
direct the merchant device to transmit the verification over the active voice connection by transmitting, to the user device over the active voice connection, an acknowledgement that the predetermined audible signal has been detected.

18. The system of claim 16, wherein the payment management facility directs the physical processor to process the inaudible payment information as payment in the transaction between the user and the merchant by:
   directing the merchant device to transmit the inaudible payment information to a third-party payment server device;
   receiving, from the third-party payment server device, a verification of the inaudible payment information; and
   applying the inaudible payment information as payment in the transaction between the user and the merchant.

19. The system of claim 16, wherein the physical processor and the payment management facility are implemented in the merchant device.

20. The system of claim 16, wherein the physical processor and the payment management facility are implemented in a standalone device disposed in-line with the active voice connection between the user device and the merchant device.

* * * * *